United States Patent [19]

Jelen et al.

[11] Patent Number: 6,129,276
[45] Date of Patent: Oct. 10, 2000

[54] SHOPPING CART MOUNTED PORTABLE DATA COLLECTION DEVICE WITH TETHERED DATAFORM READER

[75] Inventors: William M. Jelen, Akron, Ohio; Timothy P. O'Hagan, Newport Beach, Calif.

[73] Assignee: Telxon Corporation, Akron, Ohio

[21] Appl. No.: 09/364,436

[22] Filed: Jul. 30, 1999

Related U.S. Application Data

[63] Continuation of application No. 08/770,690, Dec. 19, 1996, abandoned, which is a continuation-in-part of application No. 08/744,109, Nov. 5, 1996, Pat. No. 5,821,513, and a continuation-in-part of application No. 08/668,343, Jun. 26, 1996, Pat. No. 5,821,512.

[51] Int. Cl.$^7$ .................................................. G06K 15/00
[52] U.S. Cl. ............................ 235/383; 235/375; 705/14
[58] Field of Search ................................. 235/383, 360, 235/375, 462.01, 472.01, 385; 705/14, 20, 21

[56] References Cited

U.S. PATENT DOCUMENTS

| | | |
|---|---|---|
| 4,323,773 | 4/1982 | Carpenter . |
| 4,345,315 | 8/1982 | Cadotte et al. . |
| 4,415,065 | 11/1983 | Sandstedt . |
| 4,703,423 | 10/1987 | Bado et al. . |
| 4,727,245 | 2/1988 | Dobbins et al. . |
| 4,776,295 | 10/1988 | Davis et al. . |
| 4,973,952 | 11/1990 | Malec ................................. 340/825.35 |
| 5,012,349 | 4/1991 | de Fay . |
| 5,013,387 | 5/1991 | Goodwin et al. . |
| 5,047,614 | 9/1991 | Bianco . |
| 5,064,012 | 11/1991 | Losego . |
| 5,189,291 | 2/1993 | Siemiatkowski . |
| 5,250,789 | 10/1993 | Johnsen ..................................... 235/383 |
| 5,288,980 | 2/1994 | Patel et al. . |
| 5,295,064 | 3/1994 | Malec et al. . |
| 5,323,098 | 6/1994 | Hamaguchi et al. . |
| 5,340,971 | 8/1994 | Rockstein et al. . |
| 5,361,871 | 11/1994 | Gupta et al. . |
| 5,382,778 | 1/1995 | Takahira et al. . |
| 5,382,779 | 1/1995 | Gupta ..................................... 235/383 |
| 5,448,046 | 9/1995 | Swartz . |
| 5,484,991 | 1/1996 | Sherman et al. . |
| 5,493,107 | 2/1996 | Gupta et al. . |
| 5,534,684 | 7/1996 | Danielson . |
| 5,640,002 | 6/1997 | Ruppert et al. .......................... 235/472 |

FOREIGN PATENT DOCUMENTS

| | | |
|---|---|---|
| 0170194 | 5/1986 | European Pat. Off. . |
| 0840276 | 2/1996 | Japan . |
| 2286567 | 2/1994 | United Kingdom . |
| 8903555 | 4/1989 | WIPO . |
| 9304449 | 3/1993 | WIPO . |

*Primary Examiner*—Thien M. Le
*Attorney, Agent, or Firm*—Amin, Eschweiler & Turocy, LLP

[57] ABSTRACT

A system for acquiring shopping list information includes a user terminal and a base unit in selective data communication via a wide-area network, such as the global Internet, common data carrier or a modulated wave propagating over a public utility. The user terminal includes a bar code scanner for getting Uniform Product Code information from a product container or from a manufacturer's coupon. The user compiles, via the user terminal, a shopping list database by scanning previously obtained products, manufacturers coupons, or using direct user input via an interface such as a keyboard or mouse. Once compiled, the database is selectively transmitted to a base unit situated at a retailer via the wide-area network.

25 Claims, 17 Drawing Sheets

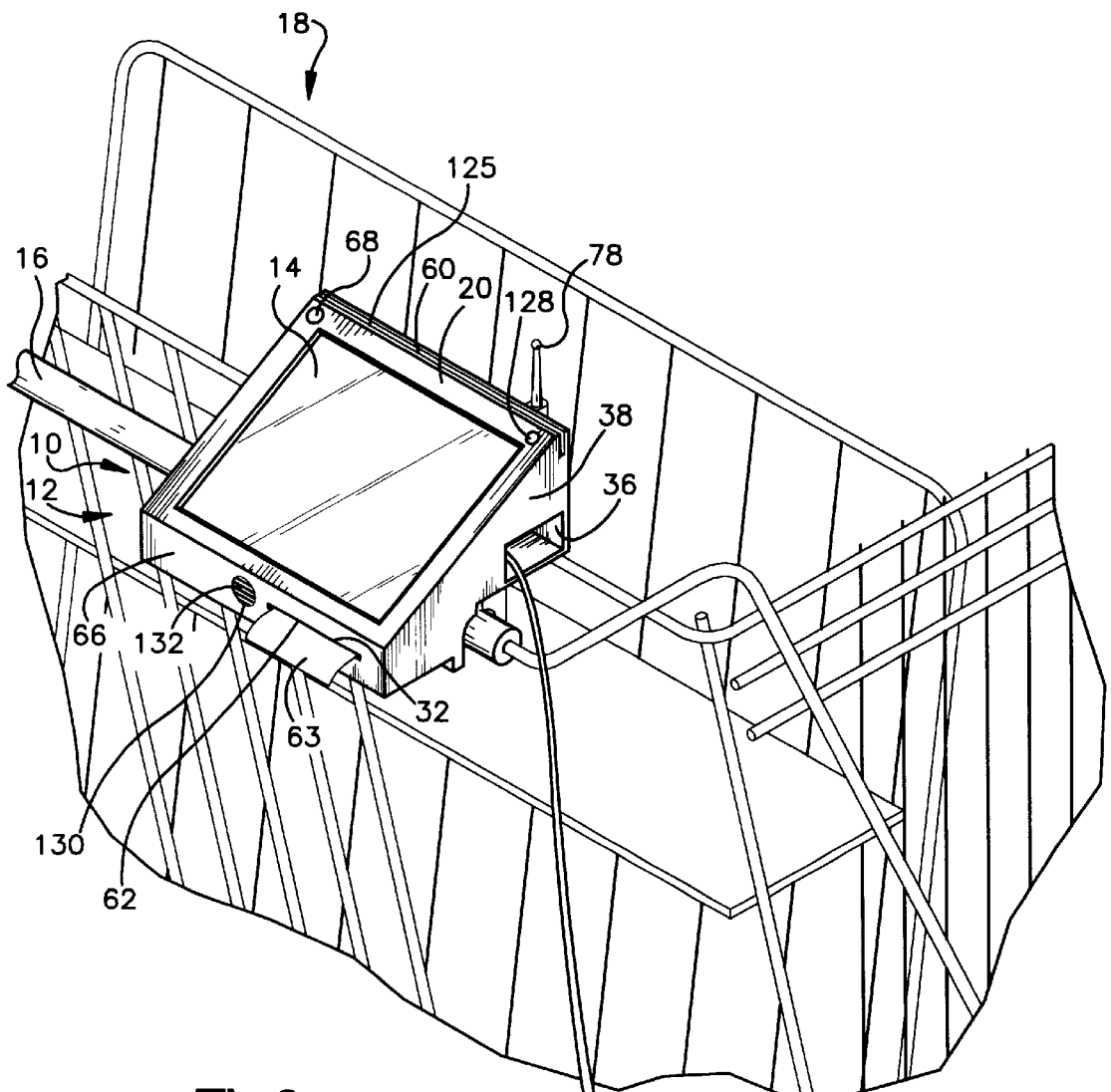
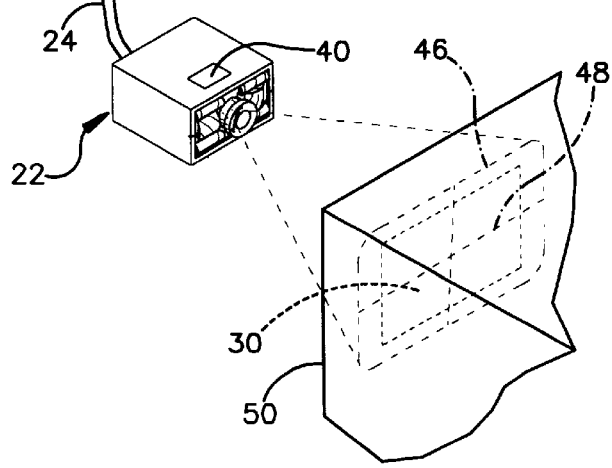
Fig.2

| Server | | |
|---|---|---|
| HTML Page Storage | Data Base Storage | Programs |
| Introductory Page<br>Invalid I.D. Page<br>Main Menu Page<br>Generic Confirm Purchase Page<br>Custom Confirm Purchase Pages<br>Location Based Advertisement Pages<br>Recipe Selection Sub-Menu Page<br>Recipe Form Page<br>Store Map Page<br>Check-Out Page<br>Prepared Order Item Sub-Menu Page | UPC<br>Price<br>Description<br>Recipes<br>Store Locations | Customer Verification Program<br>Bar Code Read Program<br>Location Search Program<br>Recipe Search Program<br>Running Total Program<br>Check-Out Program<br>Customer Location Program |

Fig.8

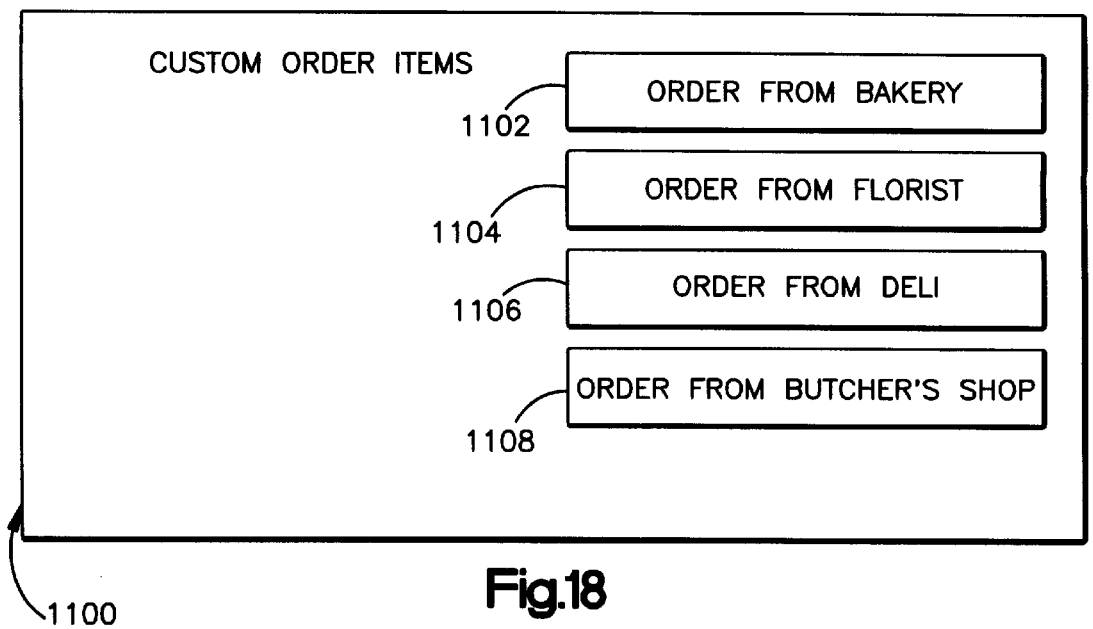
Fig.18
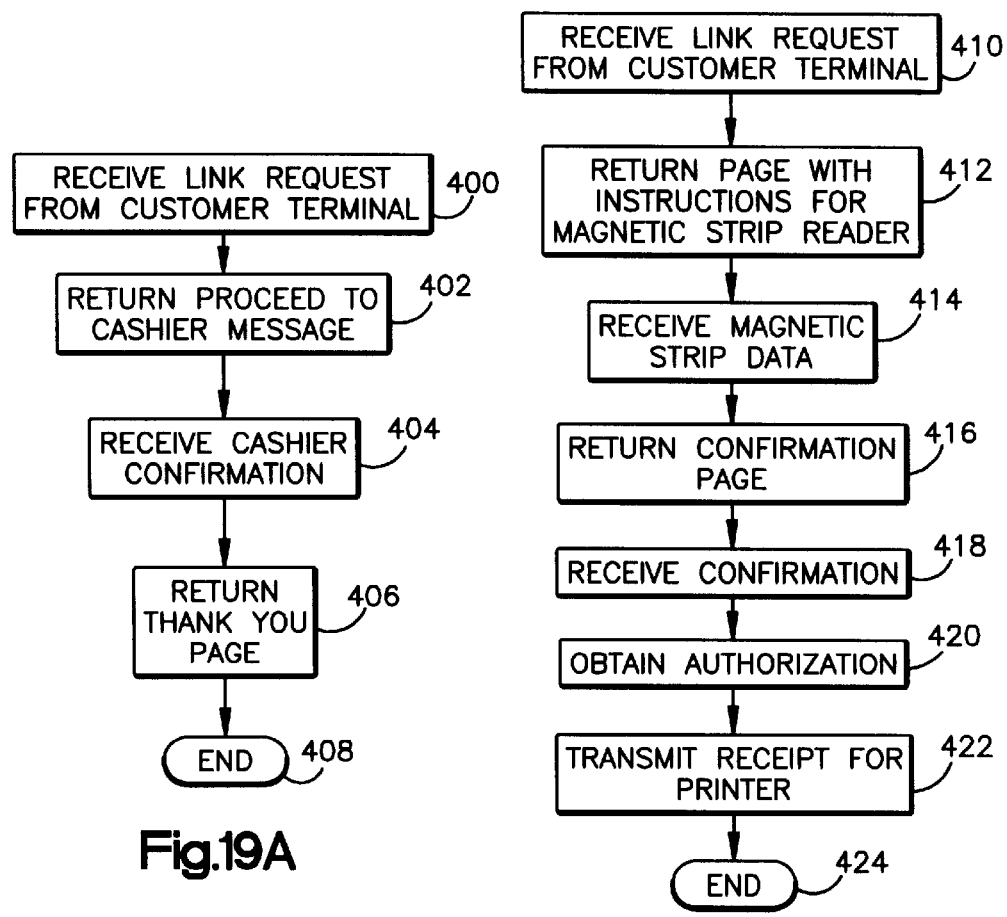
Fig.19A
Fig.19B

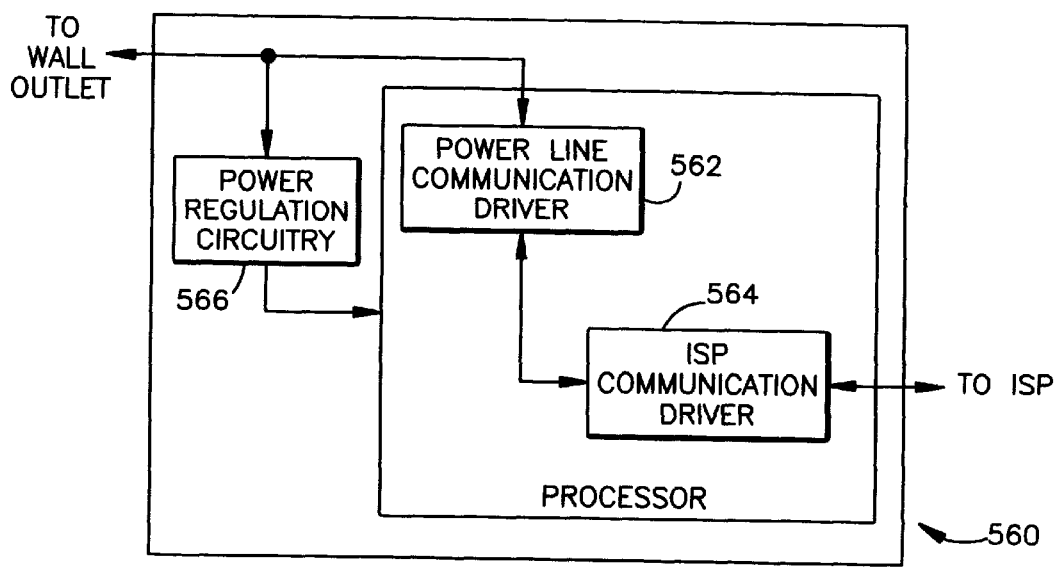
Fig.25
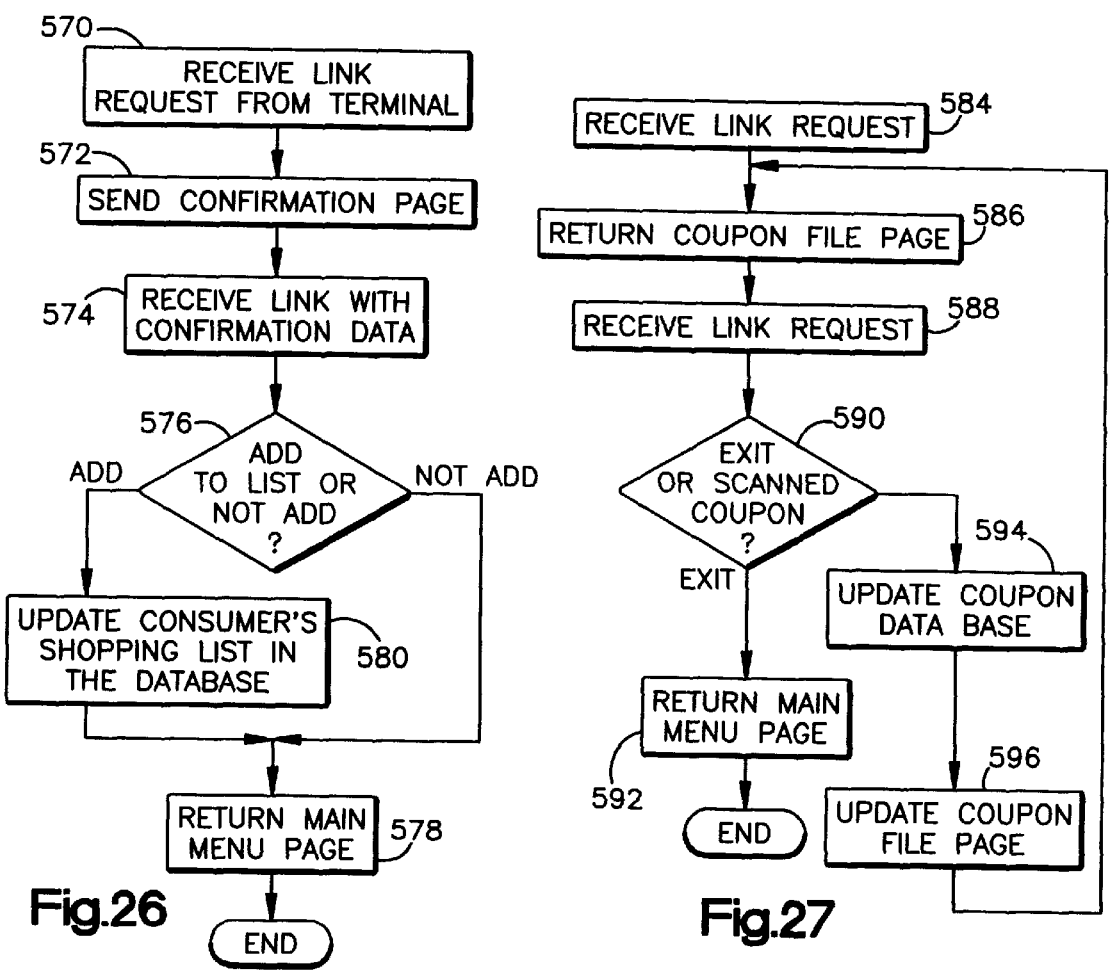
Fig.26
Fig.27

SHOPPING CART MOUNTED PORTABLE DATA COLLECTION DEVICE WITH TETHERED DATAFORM READER

This application is a continuation of 08/770,690 filed Dec. 19, 1996 now abandoned, which is continuation-in-part of U.S. patent application Ser. No. 08/744,109 filed Nov. 5, 1996 U.S. Pat. No. 5,821,513 and U.S. patent application Ser. No. 08/668,343, filed Jun. 26, 1996, U.S. Pat. No. 5,821,512.

BACKGROUND OF THE INVENTION

The invention is directed to the art of automated generation of shopping list information on a consumer data processing device and will be described with general reference thereto. However, it will be appreciated that the invention has broader application, such as in the construction of any database for ordering which information is taken directly from indicia disposed on previously obtained items or indicia representative of products for which an order will be effected.

There is an increasing acceptance and reliance on digital or computer technology by the common consumer. Personal computers have found their way into a significant number of households. Personal computer owners are becoming both comfortable with the technology associated with their computer, as well as appreciating the various applications and services that a personal computer may perform.

Personal computers are but one small portion of the encroachment of digital technology into the consumer home. Consumers are exposed to digital technology in appliance controls; entertainment devices, such as stereos and videocassette recorders; as well as such devices as personal information managers, electronic calendars, and the like.

In addition to the foregoing, there has been a rapid increase in electronic data interchange which significantly involves the typical consumer. Perhaps the biggest growth of such interchange has been by virtue of the growth and the on-line market. This growth commenced with point-to-point data communication, as with bulletin board services ("BBSs"), and has been substantially accelerated by the rapid growth of the global Internet. The proliferation of digital integration and data communication has reached several areas not traditionally associated with such technology. The effects have grown to reach areas such as food distribution by implementation in grocery stores. It is now common for consumers to prepare grocery lists and communicate them via facsimile to the grocer. In such instances, the consumer often pays a small fee for assembly and delivery of the requisite items, which fee is often waived with a sufficiently large order. The grocer is provided with a regular source of business. The consumer is provided with convenience, coupled with savings realized by forfeiting spontaneous and superfluous purchases.

One concern associated with the foregoing is the requirement that the consumer build and maintain a database of products. Further, the consumer must have fax capabilities to communicate this information to the grocer. Thus, a word processor, facsimile modem or fax machine and printer are required. This is both a substantial dollar investment, as well as increase in sophistication and time to set up the infrastructure necessary to take advantage of the grocer's service.

The subject applications solves the foregoing problems, and others, and provides an inexpensive, easy-to-use system for obtaining product information, assembling a list and communicating this list to the grocer.

SUMMARY OF THE INVENTION

In accordance with the present invention, there is provided a system for building shopping list information which includes a remote communicator which provides for remote data interchange between a base unit and an associated consumer list. The list is built with data obtained directly from indicia associated with either a product, such as with a uniform product code label, or from secondary sources such as coupons associated with purchases.

In accordance with another aspect of the present invention, there is provided a bar code scanner which allows for direct input of the indicia into the consumer terminal to build the database of products to be purchased.

In accordance with yet another aspect of the present invention, there is provided a memory, processor, and software to allow for building of a customized database related to the consumer's desired purchases.

In accordance with yet a further aspect of the present invention, there is provided a mechanism by which product information residing in a consumer or portable terminal may be readily communicated with a supplier or merchant.

In accordance with another aspect of the present invention, there is provided a method for automatically generating a list of items to be purchased and communicating them to a retailer.

An advantage of the present invention is the provision of a low-cost, easy-to-use mechanism by which purchases may be selected and a list of purchase items generated.

Yet another advantage of the present invention is the provision of the system which also allows for automated assembly of discount or coupon information which is advantageously aggregated with the product information specific to desired items.

Yet another advantage of the present invention is the provision of a readily-available and easy-to-use mechanism by which data interchange may be accomplished for the foregoing list information between a retailer and a consumer.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 2 is a perspective view of the customer information terminal as mounted on the shopping cart with the dataform reader of the device being employed in a presentation mode;

FIG. 8 is a table of programs and data stored at the host computer of FIG. 1;

FIG. 18 is a representative screen layout displayed on the touch sensitive display screen of the customer information terminal of FIG. 2 in connection with a routine for permitting a customer to order a prepared item during a shopping session;

FIGS. 19a–b are a flowchart representing processing steps of the customer information terminal of FIG. 2 in connection with a routine for checking out items selected for purchase;

FIG. 25 is a block diagram of a suitable communications gateway or interface for use in placing a consumer terminal in data communication with a base unit;

FIG. 26 is a flow chart of a suitable electronic shopping list programmed to be run on a base station or merchant's terminal; and FIG. 27 is a flow chart illustrating processing of product information to form a coupon database.

DETAILED DESCRIPTION OF THE PREFERRED EMBODIMENT

Figure 1:
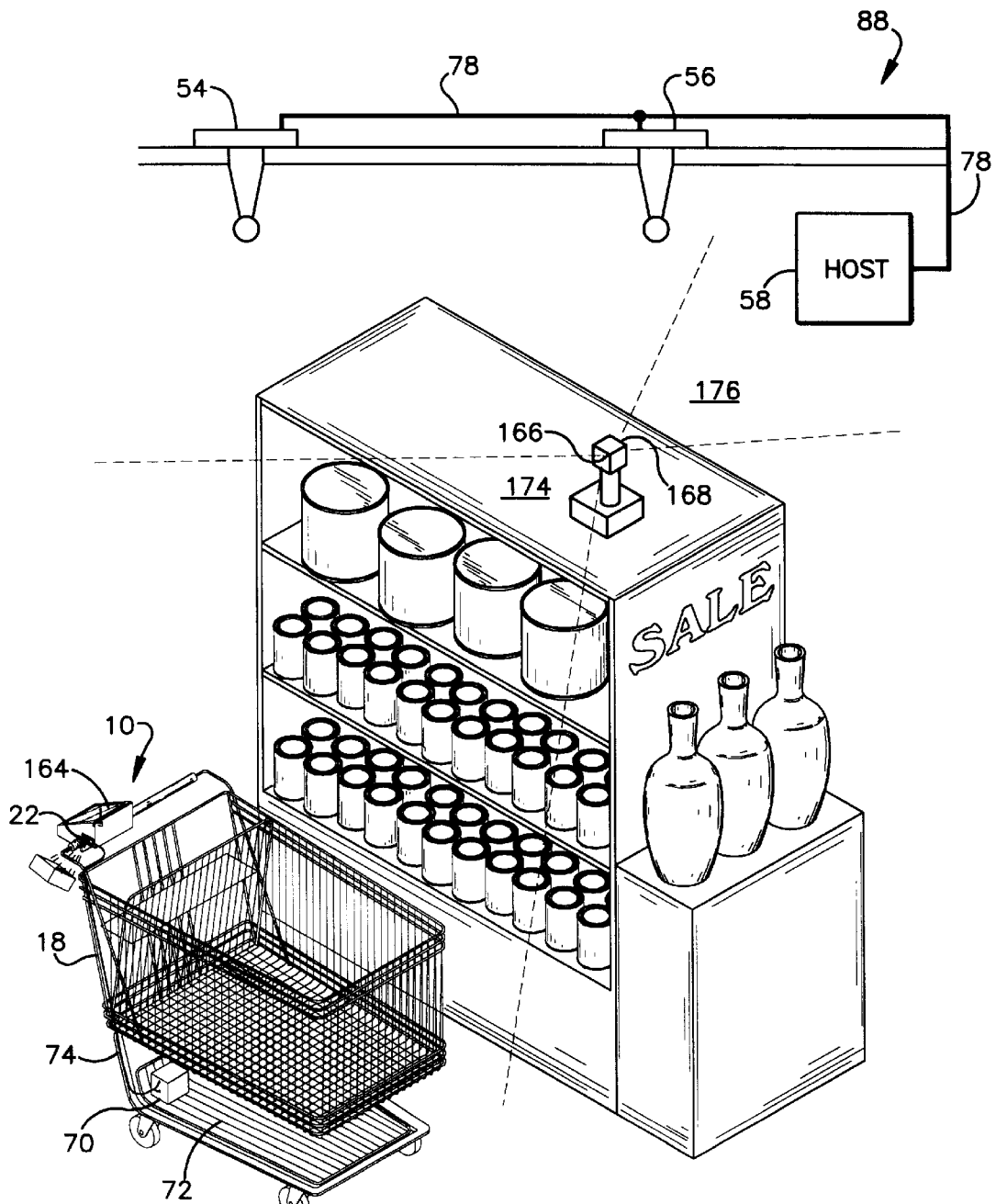
FIG. 1 is a perspective view of a portion of a retail store utilizing the customer information system in accordance with this invention.

Referring now to the drawings wherein the showings are for the purposes of illustrating the preferred embodiment of the invention only and not for purposes of limiting same, the customer information terminal system of this invention is represented in FIG. 1. The system generally comprises a customer information terminal 10 mounted on a shopping cart 18. The terminal is communicatively linked to a host computer by a wireless LAN 88. A transceiver in the terminal communicates with an transceiver in one of a plurality of access points 54 and 56, which, in turn, communicates with the host 58 via a hard wired network topology and network operating system ("NOS") suitably implemented on an Ethernet or token ring local area network ("LAN") 78. In the preferred embodiment, data communication between the shopping cart 18 and the LAN 88 is accomplished through a radio frequency (RF) link. However, it will be readily appreciated that any medium to short distance data communication scheme, such as infrared ("IR"), are suitably employed.

The customer terminal 10 generally functions as a TCP/IP web browser which alternatively link requests data at web sites stored at the host computer 58 and, after receiving the data, displays hyper-text mark-up language ("HTML") web pages to the customer on display 14.

Using a HTML browser format advantageously provides flexibility on the particular hardware implemented in the customer terminal 10. For example, powerful HTML browsers exist under UNIX, WINDOWS, OS/2, and MACINTOSH environments. Thus, there is no need to engage in a costly design of a proprietary hardware system.

Web pages displayable on the terminal 10 advantageously provided, include information pertinent to the customer's shopping experience. The customer terminal 10 generates the link requests based on at least one of: (a) the current web page displayed to the customer, (b) a product identification code as read by bar code reader 22, (c) customer manual data input via interactive touch display screen 14, and (d) location in the store as determined by a transceiver 164. Although, as with the transceiver noted above, any suitable data transmission format may be used, the preferred embodiment employs an infrared IR receiver 164 detecting a unique signature data pattern transmitted by IR transceivers or transmitters 166 and 168 located at fixed locations in the store. Each of these systems will be discussed in more detail.

Figure 5:
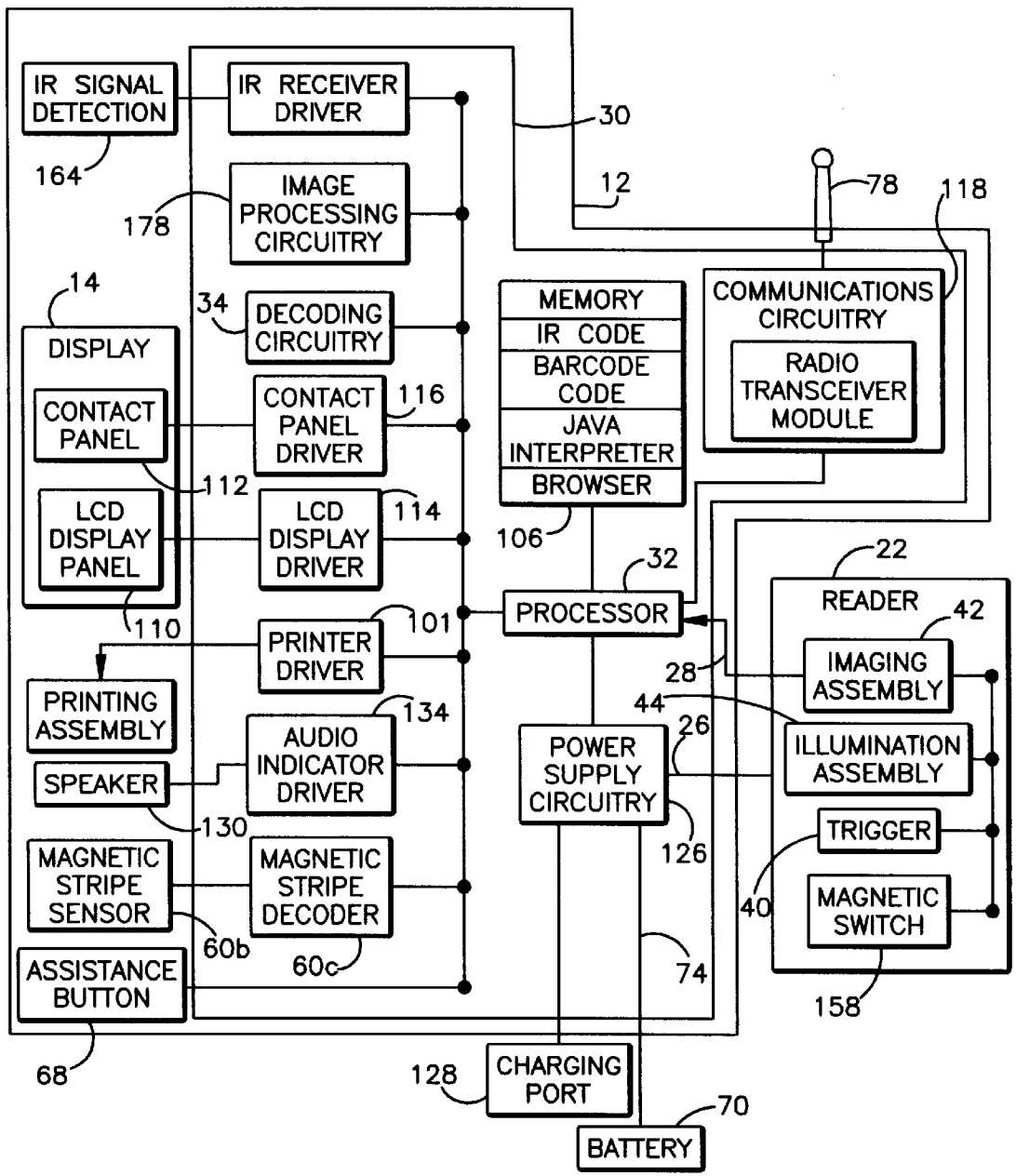
FIG. 5 is a schematic representation of selected electronic modules and circuitry of the customer information terminal of FIG. 2.

The customer terminal 10 also includes a high capacity battery 70 which is mounted in a case disposed on a bottom rack 72 of the shopping cart 18. The battery 70 preferably uses lead-acid technology because of its low cost, high energy capacity and lack of memory effect. The weight associated with a lead-acid battery is not a concern because it is mounted on the cart 18. A typical 6 volt, three cell lead-acid battery, such as the type used on a motorcycle, has an energy capacity sufficient to power the device 10 for a time period in excess of 24 hours. A power lead 74 connects the battery 70 to power circuitry 76 (shown schematically in FIG. 5) in the housing 12 which controls converting battery power to appropriate electrical parameters for operating the various components of terminal 10. The power circuitry 76 also includes charging circuitry and an external power supply port for connecting an external power supply for charging the battery. It will be appreciated that other suitable power systems, such as a photovoltaic system or hybridized power system may also advantageously be employed. Further, alternative shopping carts, such as those motor-drive carts for the physically impaired, will have their own power plant which can be utilized to supply sufficient power for the customer terminal 10.

The dataform reading assembly 22 is refractively tethered or attached to the housing 12 with an electrical cable 24. The dataform reader 22 is adapted to operate in at least two modes: a) a hand held mode; and b) a presentation mode. The hand held mode of operation is represented in FIG. 2, wherein the reader 22 is removed by the customer from an opening 36 in a side 38 of the housing 12. When supported in the opening 36, the reader 22 extends slightly beyond the side 38 so that the customer can easily grasp a front portion of the reader and slide it out of the opening. The customer moves the reader 22 to, a dataform 30 of an item so desired to be purchases or priced by the customer. The customer activates a suitable selector, such as by depressing a trigger 40, to actuate an imaging assembly 42 and an illumination assembly 44 of the reader 22. The illumination assembly 44 advantageously provides a uniform illumination pattern that substantially corresponds to an imaging area or field of view 46 of the imaging assembly 42 and additionally generates a more intense cross hair illumination pattern 48 to aid the customer in positioning the reader 22 so that the dataform 30 of an item 50 is properly within the imaging area of the reader. The uniform illumination pattern and cross hair aiming pattern are rapidly alternated between off and on states, such that one is off while the other is on. This alternation of illumination pattern avoids the difficulty of having to decode a captured dataform image which has an intense cross hair illumination pattern imposed thereon. The alternation of the illumination and cross hair patterns is rapid enough that it appears to the customer that the cross hair aiming pattern is continuously on.

While keeping the trigger 40 depressed, the customer aims the cross hair pattern 48 at a center of the dataform 30. The customer moves the reader 22 toward the item 50 until an audible tone or "beep" is emitted by a speaker 130 indicating that the dataform 30 has been successfully read and decoded. The item's price and product name or description and product size will appear on the display 14 (this functionality will be discussed in more detail later). After the "beep" is heard, the reader 22 is returned to the opening 36 and slid into the housing 12.

Figure 4:
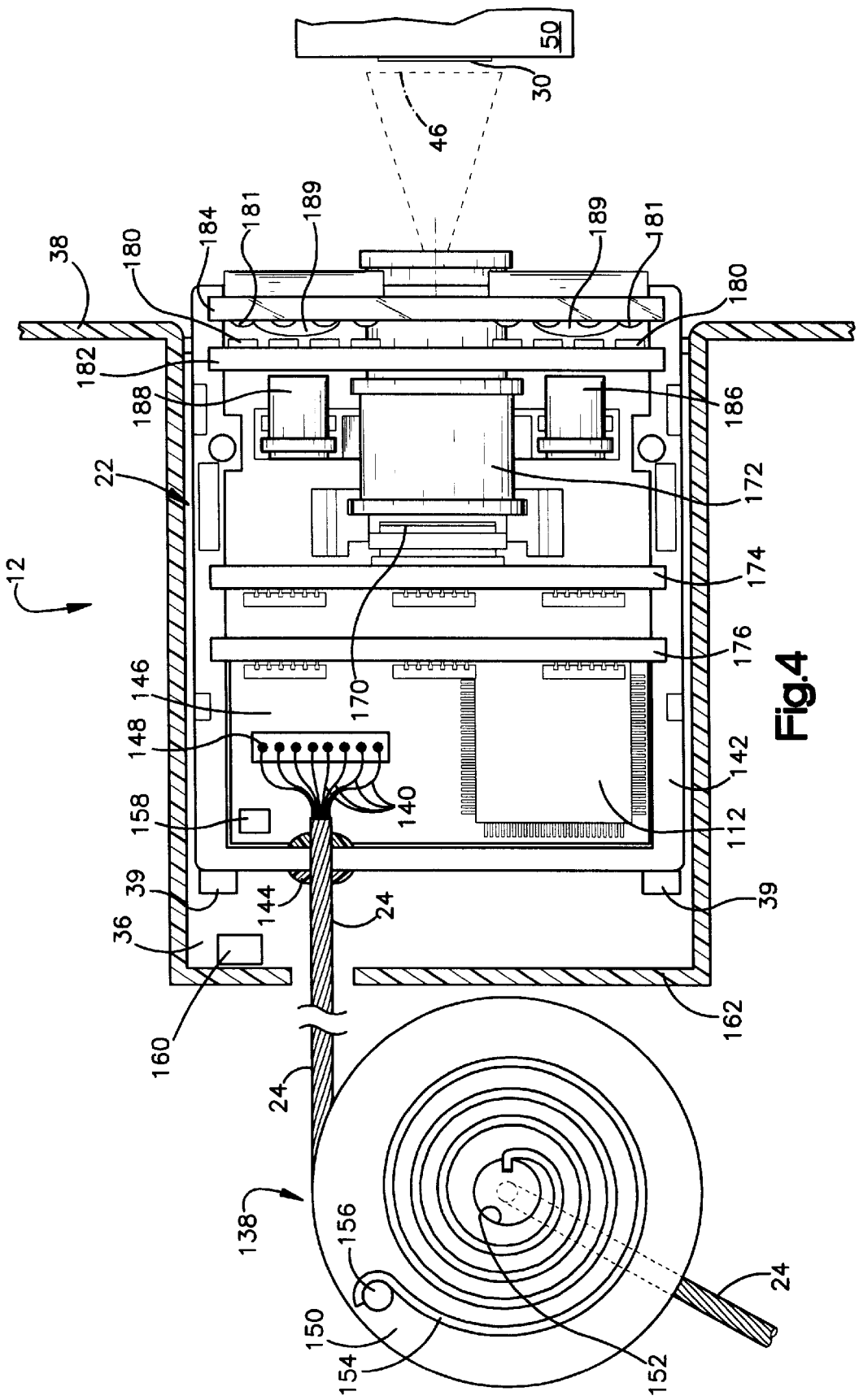
FIG. 4 is a view, partly in section and partly in top plan, of the retractable, tethered dataform reader of the customer information terminal of FIG. 2.

In the presentation mode of operation shown in FIGS. 1 and 4, the reader 22 is disposed in the housing opening 36 and the customer reads a dataform 30 affixed to an item 50 by moving the item to the reader 22. While the reader 22 remains in the housing opening 36, a magnetic switch 158 enclosed in a back portion of a reader module housing 142 of the reader 22 is turned on by a magnet 160 positioned in the opening 36 when the reader is positioned in the opening. Actuation of the magnetic switch 158 causes the imaging assembly 42 and the illumination assembly 44 to be actuated. Thus, the reader 22 is continuously ready to read a dataform when it is disposed in the opening 36. When a "beep" is heard, the customer knows that the dataform 30 has been successfully imaged and decoded. In this presentation mode, the illumination pattern is continuously on and the cross hair illumination pattern is deactivated since properly "aiming" the reader 22 is not a concern. The hand held mode is advantageously used when an item on a shelf is too large or too clumsy to move from the shelf or if the customer just wishes to check a price without removing the item from the shelf. The presentation mode is advantageously employed when a selected item is smaller and more easily handled.

FIG. 4 is a cut-away view of the reader 22 and a portion of the device 10 in the region of the opening 36 showing details of a recoil or cable retraction mechanism 138 of the dataform reader 22. The reader module housing 142 is a modular unit that includes a top half and a mating bottom half. Only the bottom half of the reader housing is shown in FIG. 4 so that the internal components of the reader 22 are visible in the figure. The reader 22 is connected to the housing 12 with the cable 24. The cable 24 includes the plurality of conductors 140 for: a) coupling operating power 26 to the reader 22; b) coupling the data signal 28 from the reader 22 to the processor 32; and c) coupling control signals from a processor 32 on control board 33 (FIG. 3) to the reader 22. The cable 24 is secured to the module housing 142 of the reader with a clamping grommet 144 to prevent the reader 22 from being physically separated from the cable 24. To further secure the reader 22 to the cable 24, a knot (not shown) may be tied in the cable just inside the reader housing 142. The plurality of conductors 140 are electrically coupled to a printed circuit board 146 within the reader housing 142 by a connector 148.

The housing 12 is advantageously weather-proofed to accommodate its being periodically exposed to the elements during periods of exposure, such as while in a parking lot. Within the housing 12, the cable 24 is wrapped around a recoil spool 150. The recoil spool 150 spins about a center pin 152 of the spool. The pin 152 is a hollow cylinder such that the cable 24 may be threaded through the pin 152 and connected to circuitry within the housing 12. A spirally wound bias spring 154 is secured to the pin 152 at the center of the recoil spool 150 and to the spring tab 156 at that perimeter of the recoil spool 150 to bias the spool in a counter clockwise direction (as viewed in FIG. 4). This arrangement keeps the cable 24 under tension when the reader 22 is removed from the housing opening 20. The edge formed by the housing wall 162 and the side wall 38 is rounded to avoid wearing an outer surface of the cable 24.

The reader 22 preferably utilizes a two-dimensional imaging assembly. The imaging assembly 42 includes a two-dimensional photo sensor array 170 and an optic assembly supported in a lens housing or shroud 172 for focusing an image of the dataform 30 in the field of view 46 onto the photo sensor array 170. Conventionally available circuitry on printed circuit boards 174, 176, and 146 operate to sequentially read out charges accumulating on photo sensors of the photo sensor array 170, generate an analog composite video signal, store a digital representation of a captured image, and decode the captured image to generate the decoded data signal 28. At least a portion of this image capture, image processing, and decoding circuitry may be implemented in code executed by processor 120 on the printed circuit board 146.

The illumination assembly 44 of the reader 22 includes four sets of four illumination light emitting diodes ("LEDs") 180, which are surface mounted in the preferred embodiment and positioned on a printed circuit board 182 (only two sets of the four sets of four illumination LEDs are seen in FIG. 4). The illumination LEDs direct illumination through corresponding aligned lens portions 181 of a lens array 184 towards the imaging field of view 46. Two targeting LEDs 186, 188 operate to direct illumination through aligned apertures in board 182 and through aligned lens portion 189 in the lens array 184 and generate the cross hair illumination pattern in the field of view 46 to assist the operator in relatively positioning the reader 22 and the dataform 30. As noted above, the cross hair illumination pattern is only generated when the reader 22 is used in the hand held mode.

A more detailed description of the components of a suitable two dimensional imaging assembly for a hand held dataform reader and its operation can be found in U.S. patent application Ser. No. 08/609,344, filed Mar. 1, 1996, and entitled PORTABLE DATA COLLECTION DEVICE WITH LED TARGETING AND ILLUMINATION ASSEMBLY, the contents of which are incorporated herein in the entirety by reference.

Figure 3:
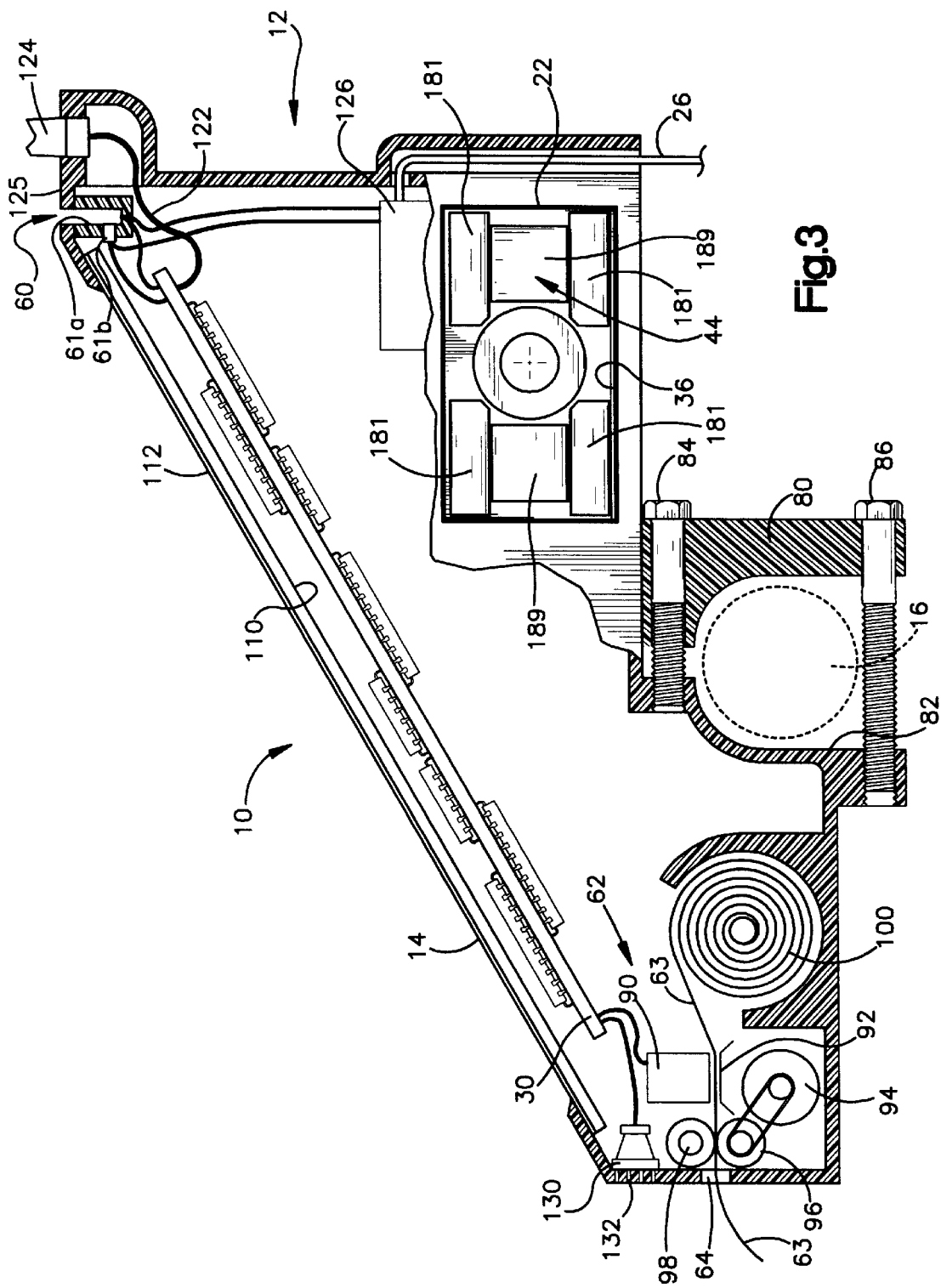
FIG. 3 is a view, partly in section and partly in elevation, of the customer information terminal of FIG. 2.

Referring to FIG. 3, a magnetic stripe reader 60 is suitably molded into an upper surface 125 of the housing 12. The stripe reader 60 includes a slotted opening 61a in the upper surface and includes a stripe sensor and reader 61b disposed along the opening. Appropriate magnetic stripe decoding circuitry is mounted on the control board 33. Magnetic stripe sensors and decoding circuitry are commonly available.

A printing assembly 62, comprised of a thermal printer in the preferred embodiment, which functions to print out a paper receipt 63 for the customer at the completion of shopping session or a recipe for an item. The printing assembly 62 discharges the receipt or recipe printout through a slot shaped opening 32 in an upright front surface 66 of the housing 12. The thermal printer assembly 62 includes a thermal printhead 90 and an opposing platen 92 to position the paper 63 against the printhead 90. A motor 94 drives a feed roller 96. The feed roller 96 operates in conjunction with an idler roller 98 to draw paper 63 from a paper roll 100 past the printhead 90 and feed the receipt or recipe printout 63 out of the slot shaped opening 64 in the housing 12. Printer driver circuitry 101 for operating the printer assembly components is mounted on the control and decoder printed circuit board 33 disposed in the housing 12. At least a portion of the circuitry 101 is suitably embodied in code stored in a memory 106 represented by a memory chip on the control printed circuit board 33 and executed by the processor 32, both on printed circuitry board 33 thermal printing assemblies including these components are commonly available. It should be appreciated that the cost of the printer could be saved by placing common printers at chosen locations within the store. The terminal 10 would transmit data via the RF network 78 to a chosen common printer. The common printer will typically be chosen based on the location of the terminal within the store as determined by the location detection system.

The user interactive display screen 14 suitably includes a liquid crystal display ("LCD") display panel 110 and an overlying touch sensitive resistive contact panel 112. However, it will be appreciated that any variety of video display terminals, such as thin film transistor (active or passive), may suitably be used. Circuitry for operating the display panel 10 and the contact panel 112 includes LCD driver circuitry 114 and contact panel driver circuitry 116. Additionally, the circuitry 114, 116 for operating the LCD display and contact panels 110, 112 may, at least in part, be implemented in software stored in the memory 106 and executed by the processor 32.

The housing 12 also supports the speaker 130 which is mounted behind a grated opening 132 in the housing 12. The speaker 130 is driven by audio indicator driver circuitry 134 mounted on the control and decoder board 33 and provides audio feedback suitably in the form of a ½ second "beep" to the customer to indicate a successful bar code dataform read and decode. The terminal 10 is secured to the shopping cart handle 16 by a clamping assembly which clamps the housing 12 to the cart pushing handle 16. The clamping assembly includes adjustable clamp 80 and an accurate clamping surface 82 of the housing 12. Two sets of two threaded bolts 84, 86 (only one set of two threaded bolts can be seen in FIG. 3) suitably extend between the clamp 80 and threaded openings in the housing 12 to secure the adjustable clamp 82 to the housing 12. When the two sets of threaded bolts 84, 86 are tightened, the housing 12 secured to the pushing handle 16 of the cart 18.

Referring again to FIG. 1, in the preferred embodiment the customer terminal 10 includes an RF transceiver for communication with a host computer 58 via a wireless local area network. Each access point 54 and 56, includes an RF transceiver for wireless communication with a customer terminal 10 located within the cell. An appropriate access point is the Aironet 640 and appropriate RF circuity for customer terminal 10 includes the Aironet 025, both available from Aironet Wireless Communications, Inc. of Akron, Ohio. Other acceptable wireless networks include any spread spectrum networks operating in accordance with IEEE 802.11 Standard.

Referring to FIG. 3, the spread spectrum radio communications circuitry 118 may be embodied in one or more IC chips mounted on the printed circuit board 33. Alternatively, the spread spectrum communications circuitry 18 may lie implemented on a separate printed circuit board with a PCMCIA interface and secured to the printed circuit board 33 through a PCMCIA standard slot interface. An antenna lead 122 connects the communications circuitry to an antenna mast 124 extending through an opening in the upper surface 125 of the housing 12. Alternatively, the antenna mast is suitably disposed inside the housing.

Referring yet again to FIG. 1, an infrared receiver 164 is located on the top portion of the upper surface of the customer information terminal 10. The receiver detects the signature illumination pattern generated by each of a plurality of infrared transmitters 166 and 168 positioned throughout the store. It is anticipated that these transmitters 166 and 168 will be placed on top shelving or in the ceiling such that the signature pattern is detectable only within a predetermined area of the store 174 and 176. Detection of a particular signature pattern indicates that the terminal is within the predetermined zone of the store. Each emitter continually modulates the IR illumination source on and off in a distinctive 1/0 pattern. The infrared receiver includes a photo detector which generates an analog waveform in accordance with the distinctive illumination pattern which, based on thresholding, can easily be decoded into the signature pattern of ones and zeros in the IR receiver driver 165. Alternatively, any position locator, such as a transponder based system, may suitably be substituted for the above-detailed zone-based system and still accomplish the position detection.

Operation of the Terminal Unit

Figure 6:
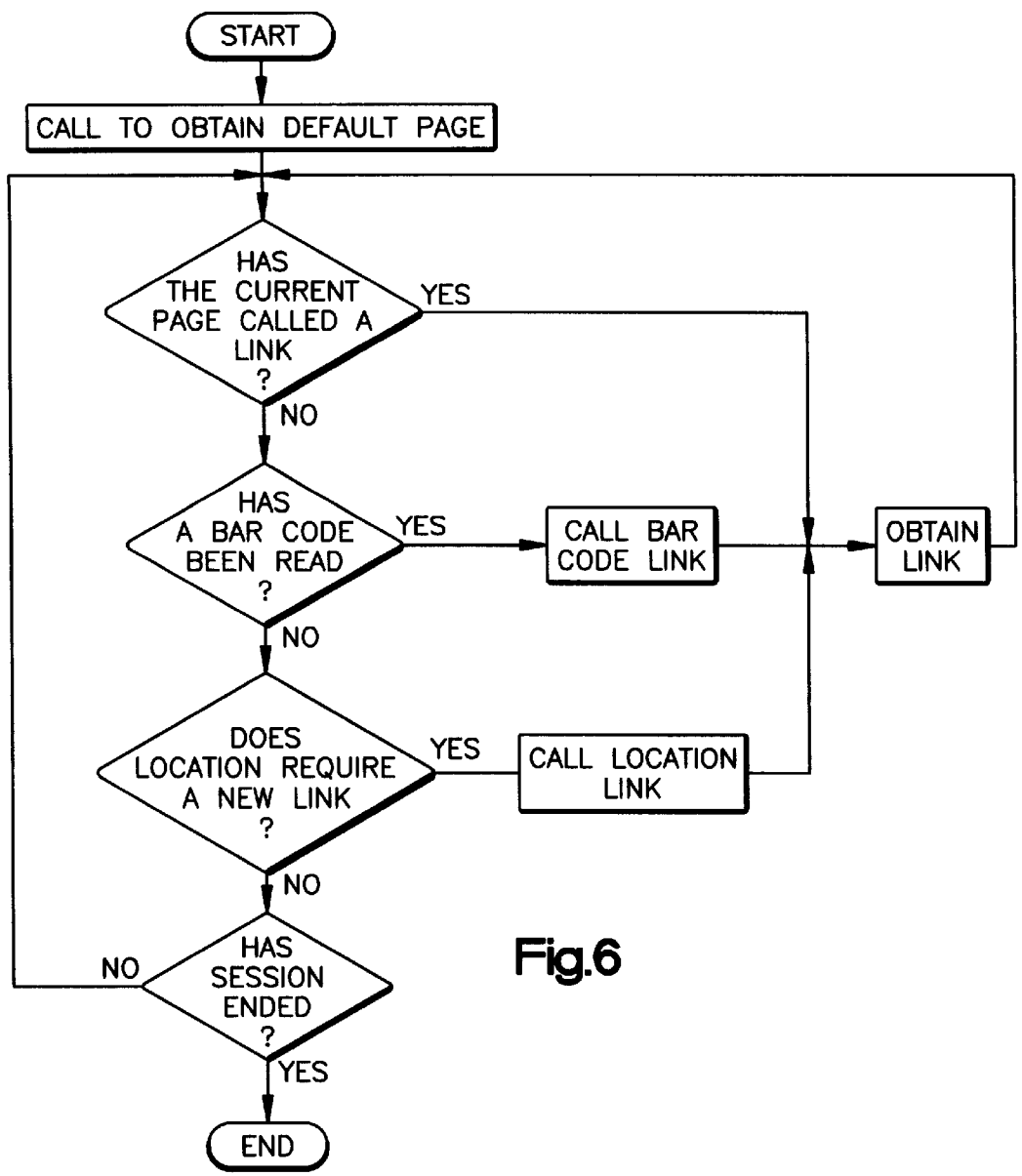
FIG. 6 is a flowchart representing processing steps of the customer information terminal of FIG. 2 in connection with a shopping session at a retail store using the device.
Figure 7:
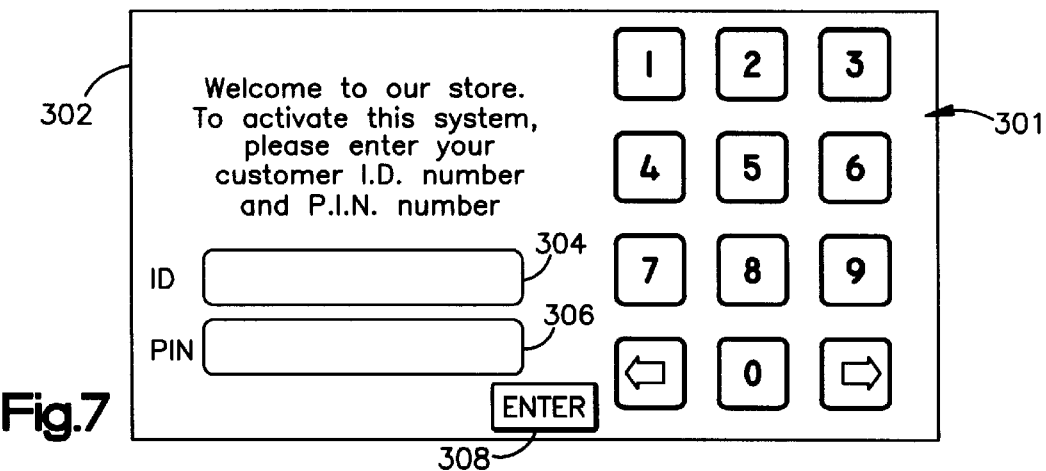
FIG. 7 is a representative introducing HTML page displayed on a touch sensitive display screen of the customer information terminal of FIG. 2.

Referring to FIG. 6, the terminal operates as a TCP/IP web browser. When the shopping cart terminal 10 is first powered, a default page 302 (FIG. 7) is requested from the host and, after received from the host is displayed on the screen at step 318. Typically the default page will be a welcome form page 302 and will graphically appear as FIG. 7.

Figure 11:
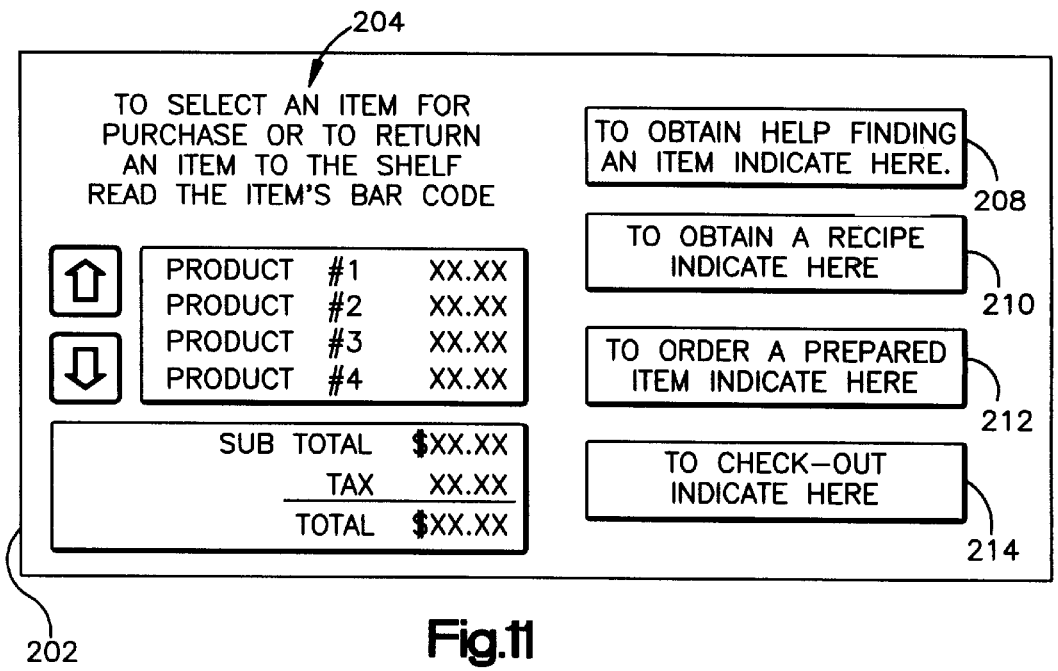
FIG. 11 is a main menu HTML page displayed on the touch sensitive display screen of the portable data collection device of FIG. 2 in connection with a shopping session.

This page includes fields 304 and 306, virtual button 308 and 12 other buttons labeled 0–9, left arrow and right arrow, indicated generally at 310. By including executable code in the HTML form page (using Sun Micro Systems Java programming code for example), each of these buttons, when activated by the user, functions as a virtual keypad for manually entering a customer ID number. Alternatively, the operator may enter his or her customer ID number by swiping the magnetic stripe on an ID card. The magnetic strip reader circuitry decodes the strip and enters it into the field using typical keyboard wedge emulation routines. Alternatively, the bar code reader may be used to read a bar code on an ID card, decode it, and enter is into the field using keyboard wedge emulation routines. The customer's PIN number is entered through the virtual keypad. Activating the enter button 308 calls a link defined in the HTML page at step 320, FIG. 6. For security, the transmission of the customer ID number and the PIN number may be encrypted using standard public key encryption techniques. The link is a TCP/IP data packet addressed to the host, and when received by the host, causes the server to launch a customer verification program stored on the server. The program verifies the customer ID number and PIN in fields 304 and 306. In response to the link request, the terminal will receive a new HTML page selected by the customer verification program on the server at 322. The returning HTML page may be one of either an invalid ID page or the main menu page. The invalid ID page will typically include HTML code to self generate a link request for the welcome page 302 after a predetermined period of time. A typical main menu HTML page is shown in FIG. 11. It includes a plurality of labeled buttons 208–214 which, if user activated, generates a link request for a selected sub menu page corresponding to the selected button at 320. Each of the sub menu pages which could be received at 322 will be discussed in more detail later.

At step 324 the system determines whether a bar code has been read. The bar code to reading system typically will be connected to the processor through a data connection, such as a serial port which generates a software interrupt when a bar code has been successfully decoded. The interrupt triggers the processor to transmit a link request to the server at step 326. The link request is a TCP/IP data packet which includes the decoded data and instructions to the server to launch a program to return an HTML confirmation page associated with the product. Step 322 represents receipt of the page. Typically the return page will be a generic page which enables the customer to verify his or her desire to purchase the product. Alternatively, the merchant may wish to use verification pages which include advertisements for promotional products when the bar code for particular products are read. These are referred to as product specific verification pages. A typical generic verification page appears in FIG. 12. The page includes field 222 which displays the product description and price. The page also includes buttons 224, 226, and 228 which, if activated, cause the HTML page to transmit a link request at 320 which launches a host program to either add the product to the customer purchase list, remove the product from the customer purchase list or to return to the main menu ignoring the read, respectively. Additionally, the page includes virtual buttons 232, 234, 236, and 238 which, if activated, cause the page to generate a link request to a sub menu page.

At step 328, the system determines whether the terminal has moved to a new location in the store. The infrared receiver will typically be connected to the processor through a serial port which generates a software interrupt when the infrared receiver detects that it has moved to a new zone. The interrupt triggers the processor to transmit a link request at step 330. The request is a TCP/IP packed addressed to the server which includes the new location and instructions to launch a program on the server which determines whether to transmit a new HTML page to the terminal or whether to return the same page as currently displayed (customer sees no change). Step 322 represents receipt. Typically a new page will be an advertisement page which is associated with a product near the location of the terminal.

Alternatively, the location detection system may be an RF system wherein a radio transceiver in a terminal interrogates and detects return signals from passive short range RF ID tags.

Step 332 represents checking whether the session has ended which typically would only be represented by shutdown of the terminal to end the flowchart at 334. If the session has not ended at 332, the system merely loops back to 320 to continue the iterative process of sending link requests and receiving HTML web pages.

It should be appreciated that the checkout routine does not end the system, but is merely a link request from the main menu at step 320. Furthermore, after a customer has successfully checked out, return to the introductory page for the next customer is also merely a link request at 320.

Server Operation

FIG. 8 is a table of a suitable setup of the server. The server includes storage of HTML Web pages, databases and programs launchable by customer terminal link requests. If the server receives a link request from a client for a specific page, the server merely returns the requested page. Alternatively, if the link request launches a program, the server executes the program and returns a page as required by the program.

As can be seen from the foregoing, the terminal basically generates link requests and receives return data. All programs associated with the system for interacting with the customer are stored and run on the server. These programs will be discussed with reference to the flowcharts shown in FIGS. 9, 10, 13, 15, 19, and 20.

Figure 9:
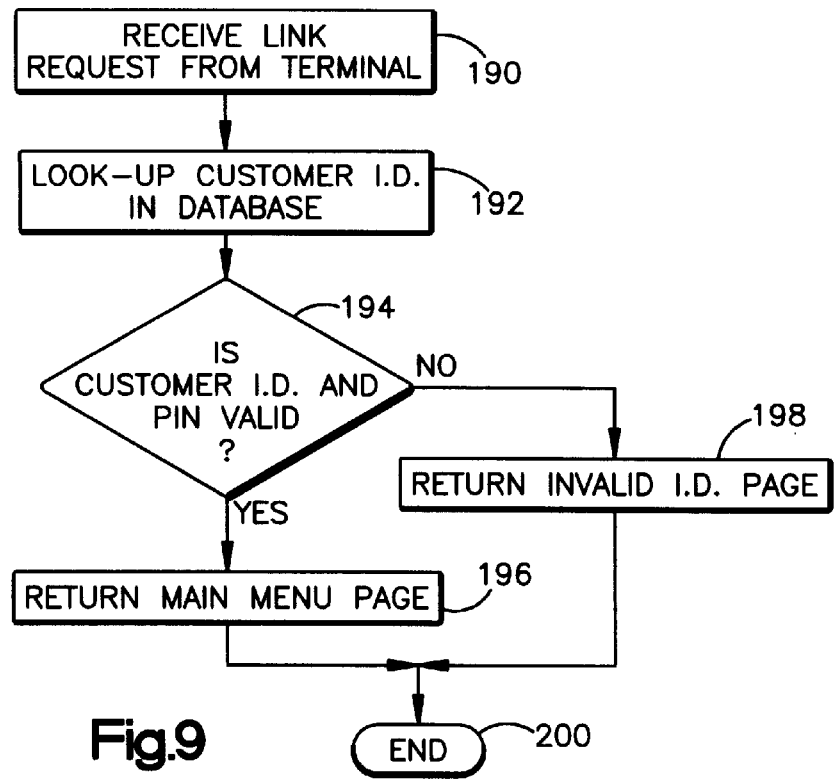
FIG. 9 is a flowchart representing processing steps of the host computer of FIG. 1 in connection with verifying the validity of a customer ID and PIN.

FIG. 9 is a flowchart showing operation of the customer verification program at the server. As previously discussed with reference to FIG. 7, activation of virtual button 308 causes the terminal to send a link request to the host computer which includes the customer ID number, the PIN number and instructions to launch the customer verification program. The program starts at 190 which represents receipt of the link request from the customer terminal. At step 192, the server looks up the customer ID number in the database and, at 194, checks whether the ID number and PIN combination is valid. If it is valid, the server returns the menu page to the terminal, FIG. 11, at 196. Alternatively, if the number is invalid, the server returns the invalid ID to the terminal page at 198. The program ends at 200.

Figure 10:
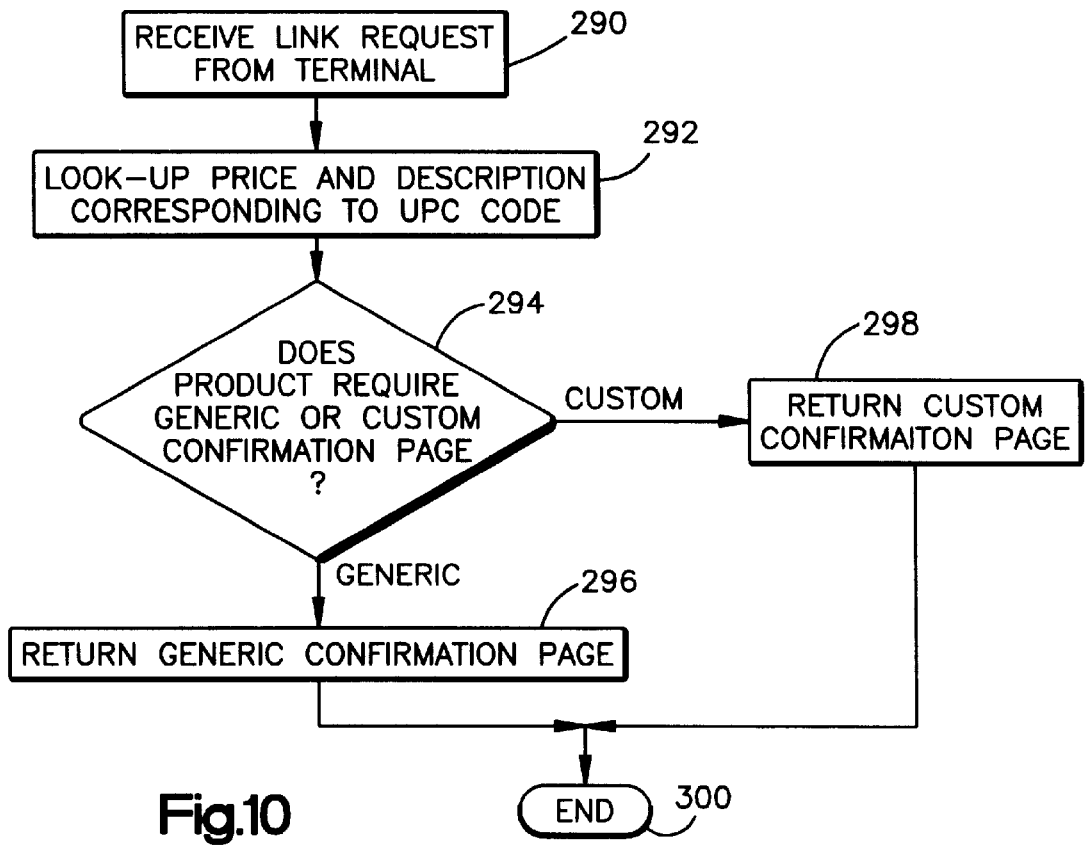
FIG. 10 is a flowchart representing processing steps at the host computer of FIG. 1 in connection with the customer information terminal reading a bar code.

As previously discussed, the customer can use the bar code reader to read a bar code which, in turn, causes the terminal to transmit a link request to launch a bar code read program at the host. FIG. 10 is a flowchart showing operation of the bar code read program. The program starts at 290 which represents receipt of link request from the customer terminal. At 292, the system looks up the price and description corresponding to the UPC code in the price and description databases. At 294, the system determines whether the confirmation page to be associated with the particular product is generic or custom. Typically this will include looking up the UPC code in a list of products to associate with a custom confirmation page. If a generic page is used, the price and description are inserted into the appropriate fields of the generic page and the page is returned to the customer terminal at 296. Alternatively, of a custom page is to be used, it is returned to the customer terminal at 298 and the system ends at 300.

Figure 12:
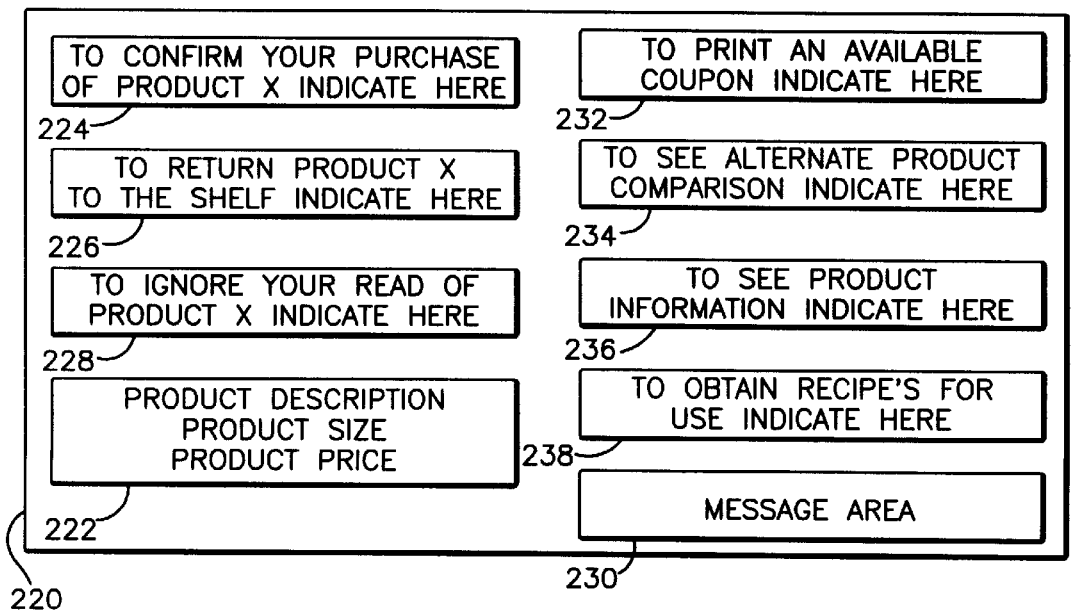
FIG. 12 is a representative generic confirmation HTML page displayed on the touch sensitive display screen of the portable data collection device of FIG. 2 after an item's bar code dataform has been read.

FIG. 12 shows a sample of a generic confirmation page 120. The page includes message field 222 which includes a description of the product and its price. Message field 230 may be used to display other information about the product. For example, if the product is a tobacco product, the message field 230 may display the Surgeon General's warning. The page 220 includes two virtual buttons 224 and 226, which if activated, cause the terminal to transmit a link requests to the host which will launch the running total program at the server. The running total program will add or remove the item from the customer's running receipt as required by the link request. Virtual button 228 causes the terminal to transmit a link request for the main menu HTML page. The page 220 also includes virtual buttons 232,234, and 236, which if activated, cause the terminal to transmit a link request to the host or a particular HTML page associated with a product coupon, product information, or alternate product information, respectively. Virtual button 238, if activated, causes the terminal to transmit a link request which launches the recipe search program on the host. A custom confirmation page would typically include the same virtual buttons, but may additionally include custom graphics related to the scanned product.

Figure 20:
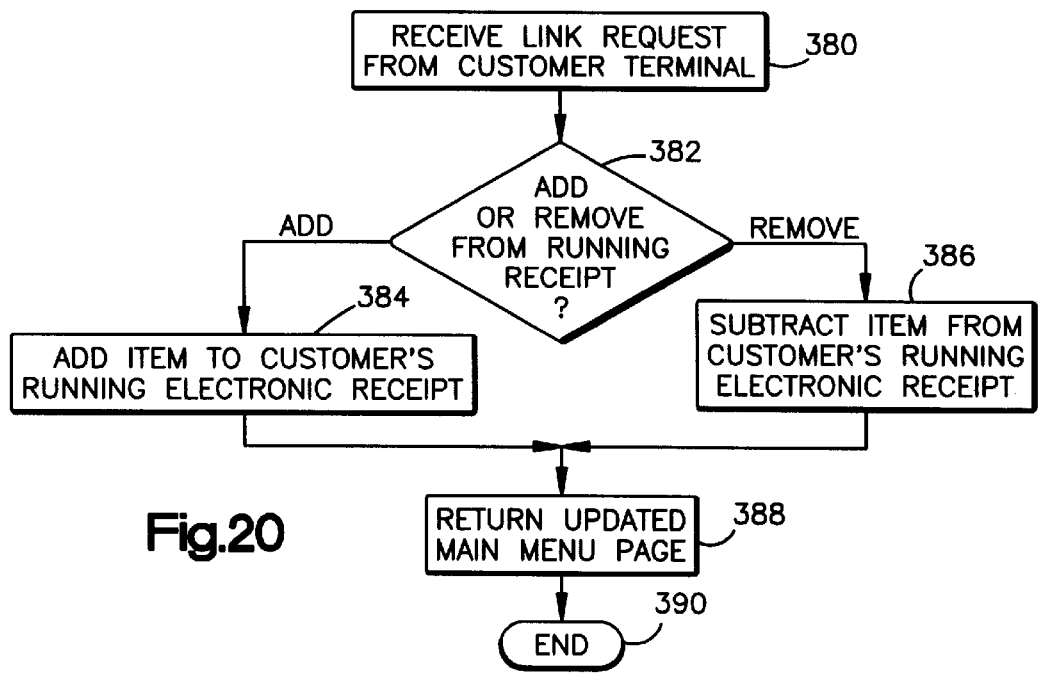
FIG. 20 is a flowchart representing processing steps of the host computer of FIG. 1 in connection with a routine for adding or removing an item from the customer's electronic receipt.

FIG. 20 is a flowchart representing the processing steps at the host computer which add or remove the item from the customer's running total. The program starts at step 380 which represents receipt of the link request from the customer terminal. The link request is a TCP/IP data packet addressed to the host which includes instructions to launch the running total program and a data field indicating whether the item is to be added or removed from the customer's running total. Step 382 represents the server determining, based on the data field, whether to add or remove the item from the customer's running total. If the item is to be added, the host adds the item to the running receipt at step 384 and returns a main menu page to the customer at step 388 with updated running receipt totals in the appropriate fields. Alternatively, if the item is to be removed at step 382, the host removes the item at 386 and returns an updated main menu page at 388. The program ends at 390.

Figure 16:
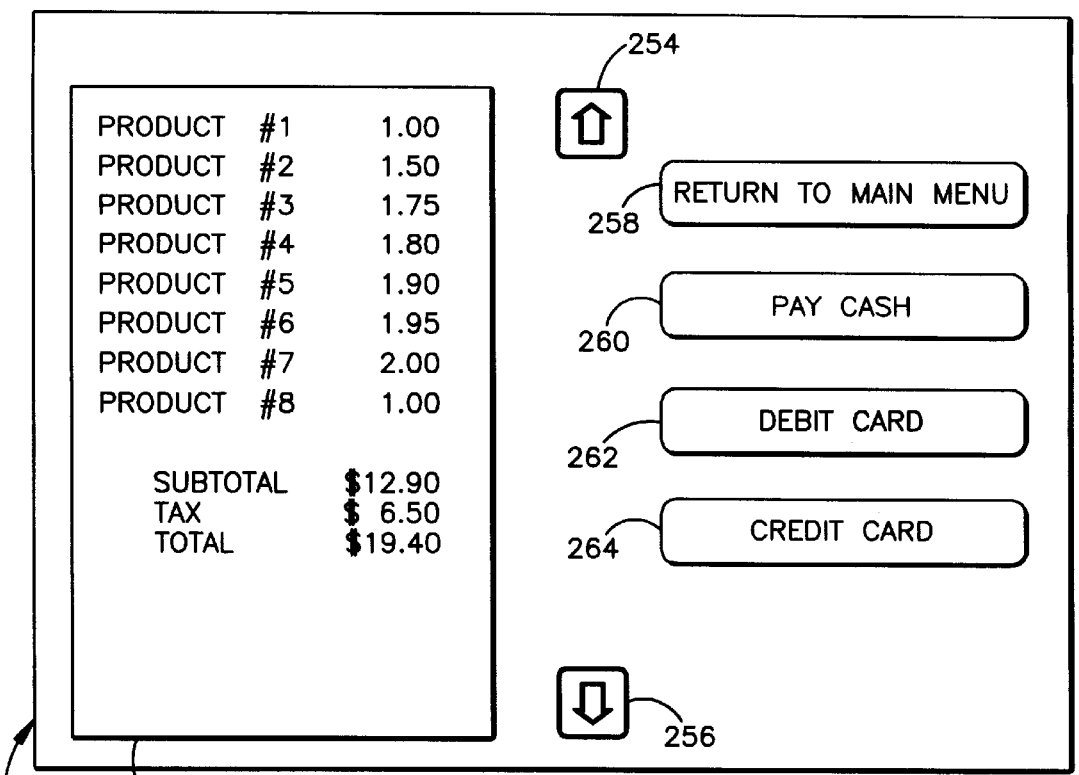
FIG. 16 is a representative HTML page displayed on the touch sensitive display screen of the customer information terminal of FIG. 2 in connection with a routine for checking out items selected for purchase.

When the customer has finished shopping, the customer activates the checkout button on the main menu. Activation of the button causes the terminal to generate a link request for the checkout form page which is graphically shown at 250 in FIG. 16.

The checkout form page 250 includes a visual representation of the customer's receipt in field 252. Virtual buttons with arrows 254 and 256 are used by the customer to scroll the receipt for viewing. The page includes virtual button 258 which, if activated by the customer, aborts the checkout routine by causing the terminal to generate a link request for the main menu page. Virtual button 260 is activated by the customer to indicate the customer's desire to pay cash which causes the terminal to transmit a link request to the host to launch the cash checkout program. Virtual buttons 262 and 264 are activated by the customer to indicate the customer's desire to pay with a debit or credit card, respectively. Activation of these buttons cause the terminal to transmit a link request to the host to launch the debit/credit checkout program.

FIG. 19*a* is a flowchart representing the cash checkout program on the server. The program starts at step 400 which represents receipt of the link request from the customer terminal. At step 402 the server returns a page to the customer terminal which instructs the customer to proceed to the cashier. Step 404 represents receipt of confirmation from the cashier that the sale is complete. The cashier will typically have a cashier's terminal communicatively coupled to the host via the network. After receipt of the cashier's confirmation, the server will send an HTML page with a thank you message to the customer at 406 and the program ends at 408. Typically the thank you page will include a timer to generate a link request for the welcome page after a predetermined period of time. This positions the terminal for the next customer.

FIG. 19*b* is a flowchart representing the debit/credit checkout program on the server. The program starts at step 410 which represents receipt of the link request from the customer terminal. At step 412 the server returns an HTML page with instructions to the customer to swipe the magnetic strip on his or her credit or debit card. Step 414 represents receipt of the credit or debit card number from the customer terminal. At step 416 the program sends a confirmation page to the customer terminal. The confirmation page includes virtual buttons for verifying the amount of the sale and entering a PIN number as appropriate for a debit card. Step 418 represents receipt of a data packet from the customer terminal which includes the PIN number and the customer's confirmation. Step 420 represents obtaining card authorization from the appropriate card issuing authority. After authorization is obtained, receipt data is transmitted to the customer terminal along with a thank you message. The program ends at 424.

As previously discussed, various customer assistance routines can be requested by the customer which include a recipe search routine, a location assistance routine and order of specially prepared items.

Figure 14:
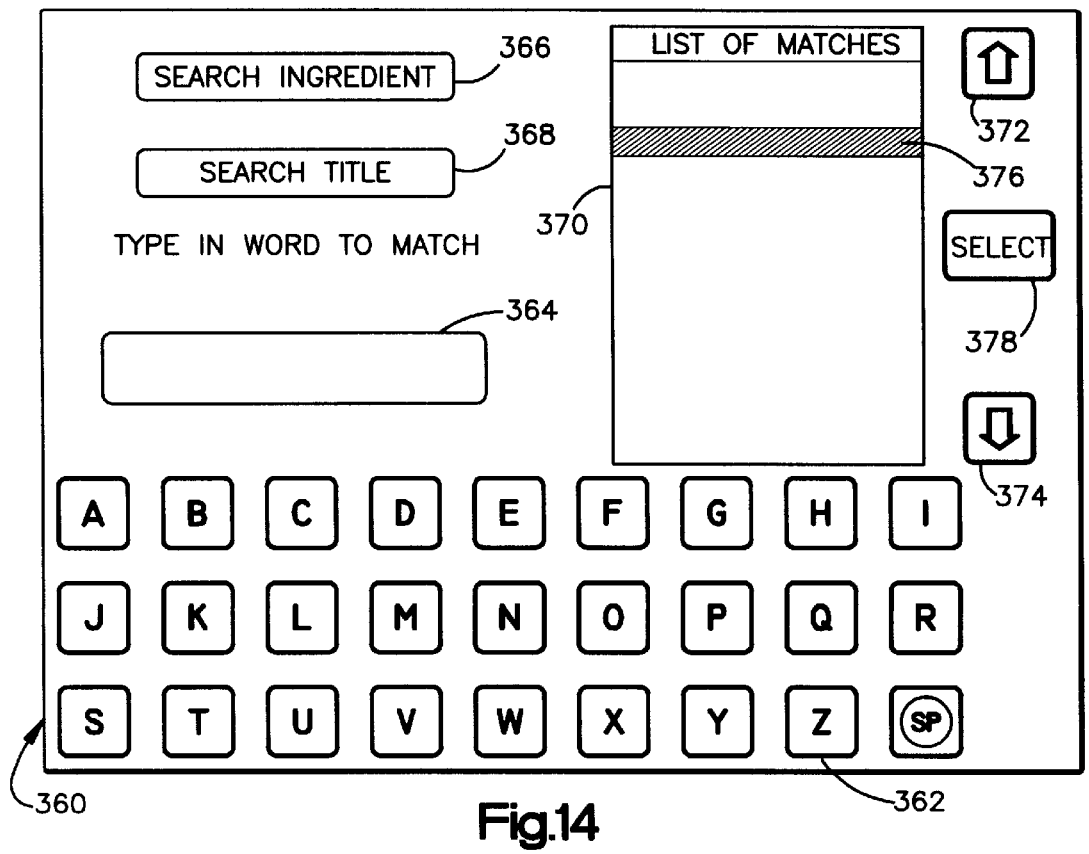
FIG. 14 is a representative HTML page displayed on the touch sensitive display screen of the customer information terminal of FIG. 2 in connection with a routine for providing a recipe using a selected food item.
Figure 15:
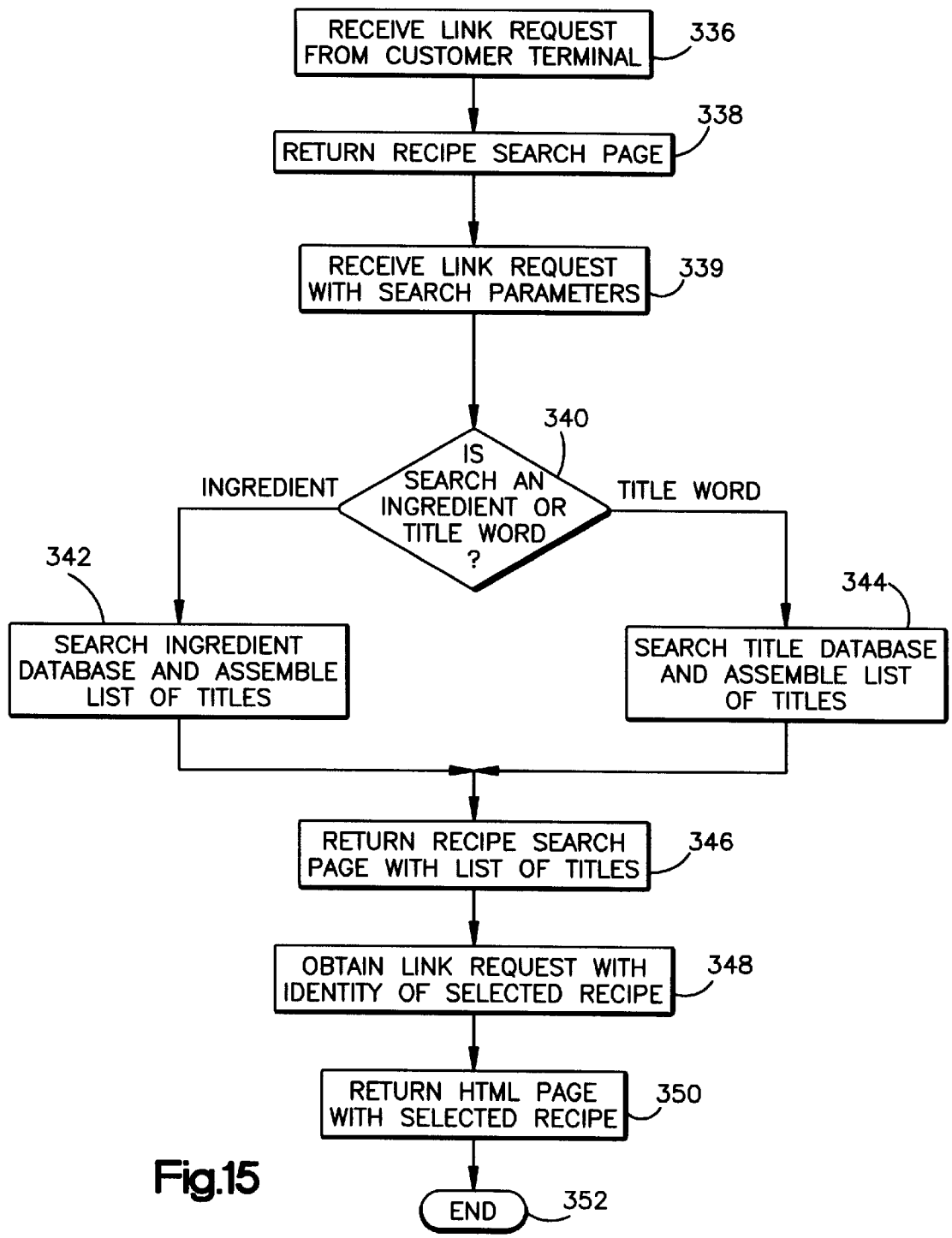
FIG. 15 is a flowchart representing processing steps of the host computer device of FIG. 1 in connection with a routine for providing a recipe using a selected food item.

FIG. 15 is a flowchart of operation of the recipe search program on the server. The customer terminal can be activated to generate a link request to launch this program from either of the main menu page 202 (FIG. 11) or the confirmation page 220 (FIG. 12). The program starts at step 336 which represents receipt of the link request. Step 338 represents return of the recipe search form page to the customer information terminal. FIG. 14 shows a sample recipe search form page 360 for obtaining search terms. The page 360 includes a plurality of virtual buttons A–Z plus "space" (designated generally at 362) which are supported by executable code such as Sun Microsystems Java which, when activated, operate to enter the designated letter into field 364. The operator uses the virtual buttons to enter a search term. It should be appreciated that if the search program is requested from the confirmation page (220 or FIG. 12), the product description may be automatically placed in field 364 and the virtual buttons are used for editing.

After entering the appropriate search term, the user activates either of virtual button 366 or 368 to generate a link request. The link request is a TCP/IP packet which includes the search term, instructions to launch the search and a field indicating whether the search is by title or ingredient. Step 340 represents determining whether the search is for an ingredient search or a title search. If an ingredient search, the host searches the recipe database at step 342 and returns the recipe search page with a list of matching recipes in scrollable field 370 at step 346. Alternatively, if a title word search, the host searches the recipe database at step 344 and returns the recipe search page with the list of matching recipes in scrollable field 370 at step 346.

Referring again to FIG. 14, the customer uses the arrow keys 372 and 374 to move highlight bar 378 to highlight the desired recipe in the scrollable field. Virtual button 378, if activated, causes the terminal to generate a link request for the HTML page with the recipe printed hereon.

Referring again to FIG. 15, step 348 represents receipt of the link request from the terminal for a specific recipe. Step 350 represents sending the recipe from the database to the customer terminal. The host program then ends at 352.

The HTML page which includes the recipe will typically include a virtual button which, if activated, causes the printer to print a hard copy of the recipe for the customer. Furthermore, the page will include a virtual button which, if activated, causes the terminal to make a link request to the main menu page or the confirmation page which was originally used to initiate the recipe search.

Figure 13:
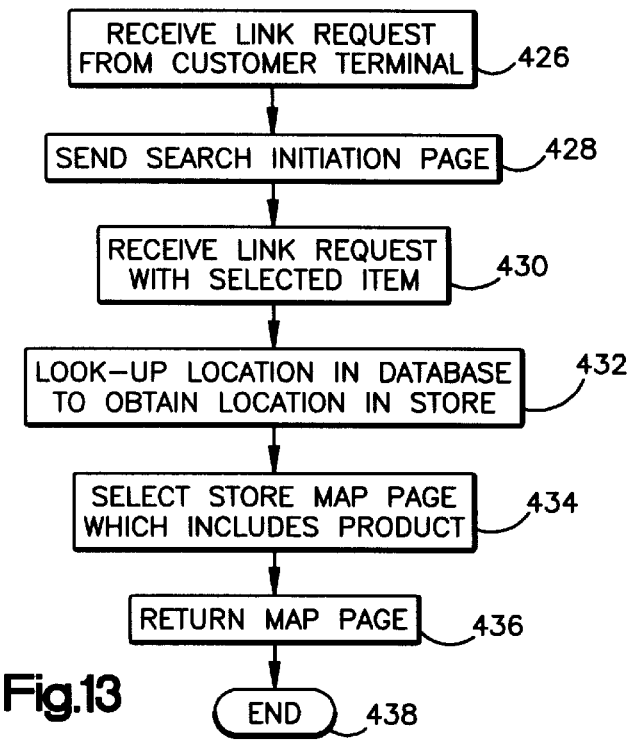
FIG. 13 is a flowchart representing processing steps of the portable data collection device of FIG. 1 in connection with a help routine for aiding a customer find a desired item.

FIG. 13 is a flowchart which represents processing steps at the host computer when the customer elects the location assistance routine by activating virtual button 208 from the main menu 202 of FIG. 11. The program starts at step 426 which represents receipt of the link request from the customer terminal. Step 128 represents return of the search initiation page to the customer terminal.

Figure 17:
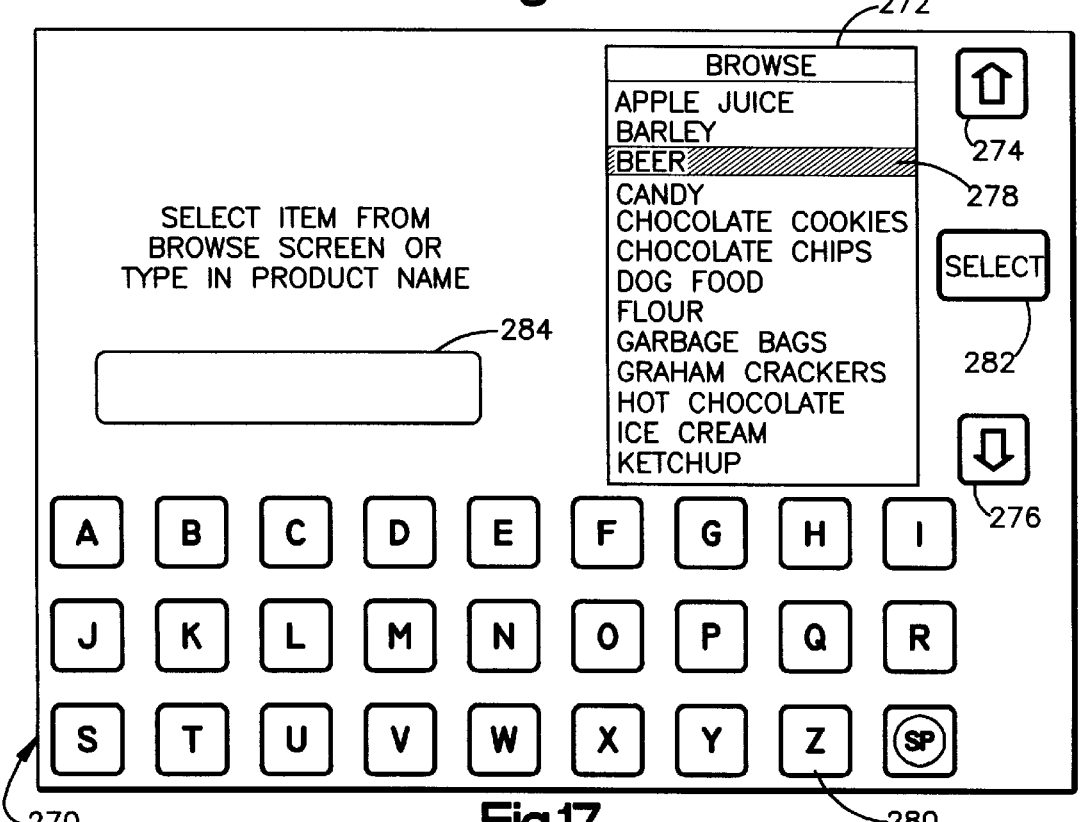
FIG. 17 is a representative HTML page displayed on the touch sensitive display screen of the customer information terminal of FIG. 2 in connection with a help routine for aiding a customer find a desired item.

FIG. 17 shows a representation of the search initiation page 270. The page 270 includes field 284 into which the customer enters the name of the desired product. The customer uses virtual buttons 280 to enter the product name. Simultaneously, all of the products available in the store are listed in scroll box 272. A highlight bar 278 will be positioned over the first item in the list which matches the letters entered by the customer. The customer in addition to entering the product name via the virtual keyboard 280 can also move the highlight bar 278 over the list by using virtual buttons 274 and 276. When the customer has positioned highlight bar 278 over the desired item, virtual button 282 can be activated to initiate a link request for an HTML page which shows the items location in the store.

Returning to FIG. 13, step 430 represents receipt of a link request which includes the selected item at the host. At step 432, the host looks up the items location in a database and at step 434, selects a page which includes a map of the portion of the store that includes the desired product. Step 36 represents transmission of the map page to the customer terminal and the program ends at step 438.

As previously indicated, virtual button 212 of the main menu 202 of FIG. 1 1, may be activated by the customer to initiate programs for ordering prepared items. Activation of button 212 will generate a link request for a sub menu page which will list the types of item which may be ordered. It is anticipated that such items may include floral products, butcher shop products, bakery products or deli products. Each sub routine will typically include a series of HTML pages which interact with the customer to order a selected item.

Next, a detailed description will be provided for a system incorporating an end user terminal which allows for ease in assembly of shopping list information, as well as communication of such a data base formed from such information to the retailer. The subject invention is provided with a detailed description of a preferred embodiment employing an application-specific, portable hand-held terminal. However, it will be appreciated by one of ordinary skill in the art that a similar form and function may be accomplished with a personal computer workstation as may be found in a significant number of conventional households.

Figure 21:
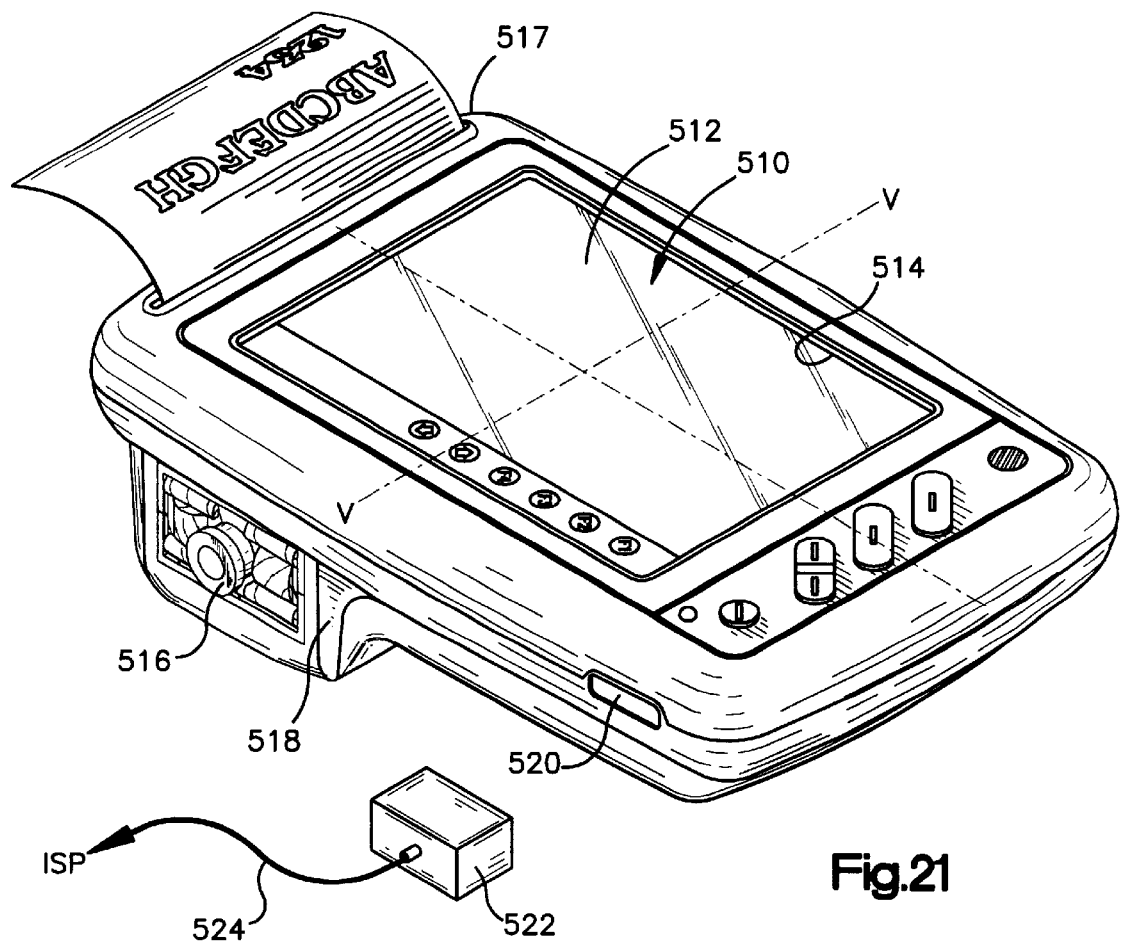
FIG. 21 is a perspective view of a hand-held consumer terminal suitably used in connection with the assembly and transmission of an automated shopping list in connection with the subject application.

FIG. 21 shows the preferred embodiment of a consumer terminal specifically designed for use in conjunction with consumer assembly and transmission of shopping list information. It includes an interactive display screen 510 which suitably includes a liquid crystal display screen 512 with an overlaying or integrated contact panel 514. A barcode reader 516 of construction, suitably similar to that described with reference to the shopping cart terminal, is mounted within the housing 518. A printer system advantageously integrated in the housing 518, and is suitably of similar construction to that described with reference to the shopping cart terminal. The printer 518 discharges paper 515 through a slot shaped opening 517 in the housing 518.

Figure 22:
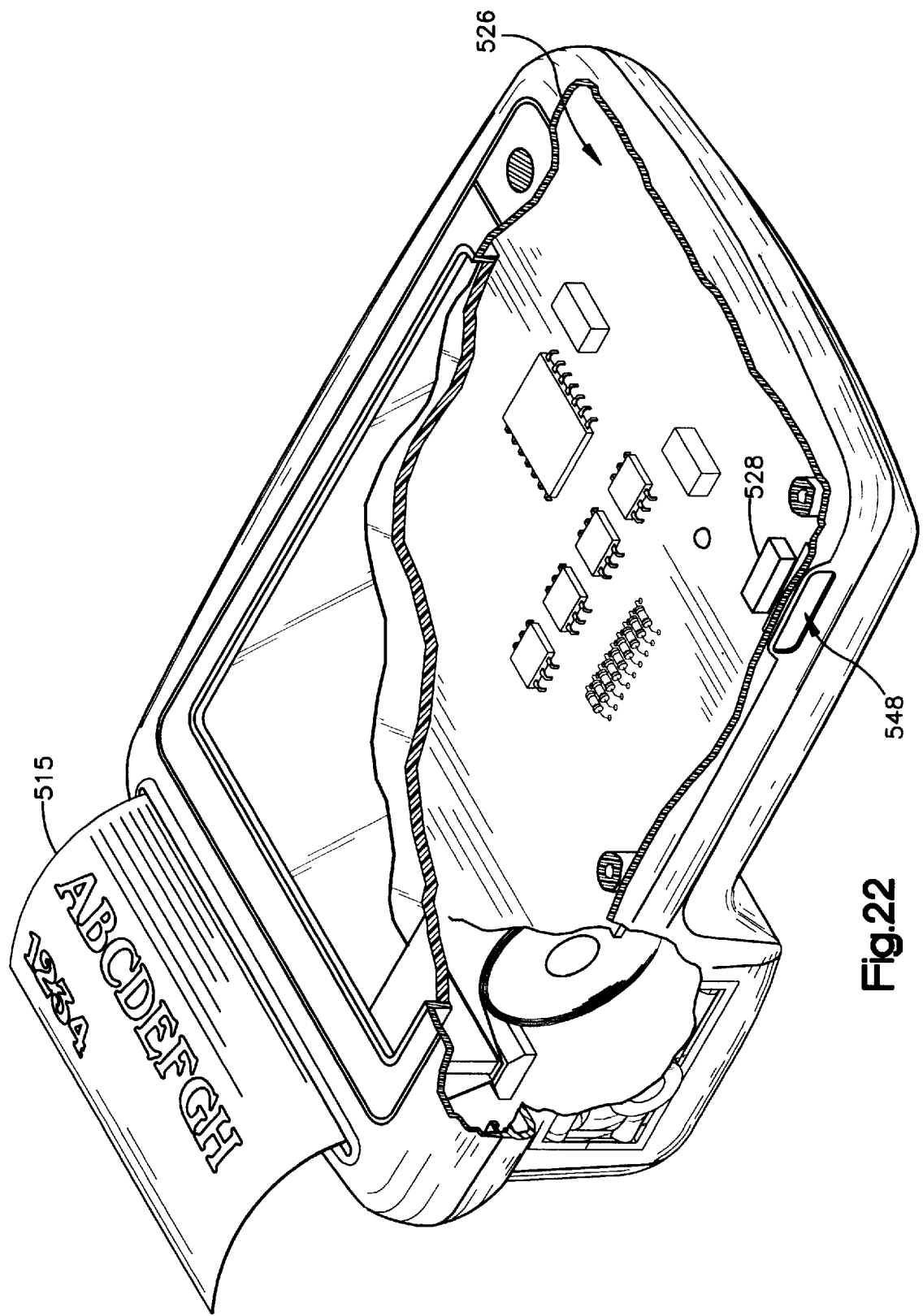
FIG. 22 illustrates a perspective, cut-away view of an interior of the unit of FIG. 21.
Figure 23:
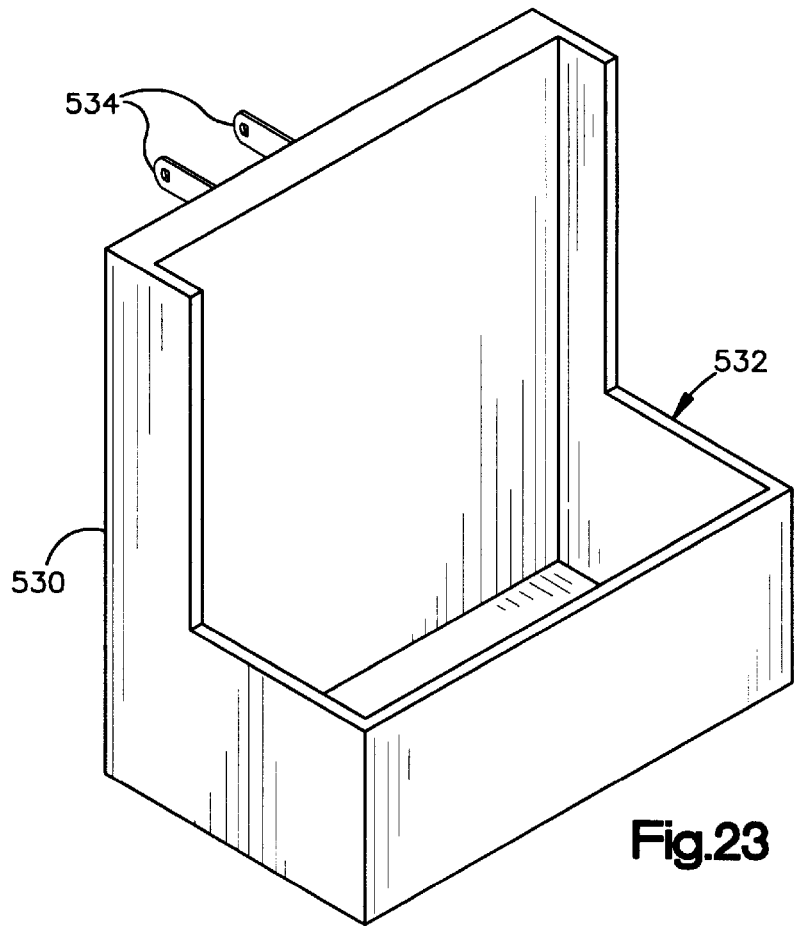
FIG. 23 is a perspective view of a suitable docking station/charging station for use in connection with the portable unit of FIGS. 21 and 22.
Figure 24:
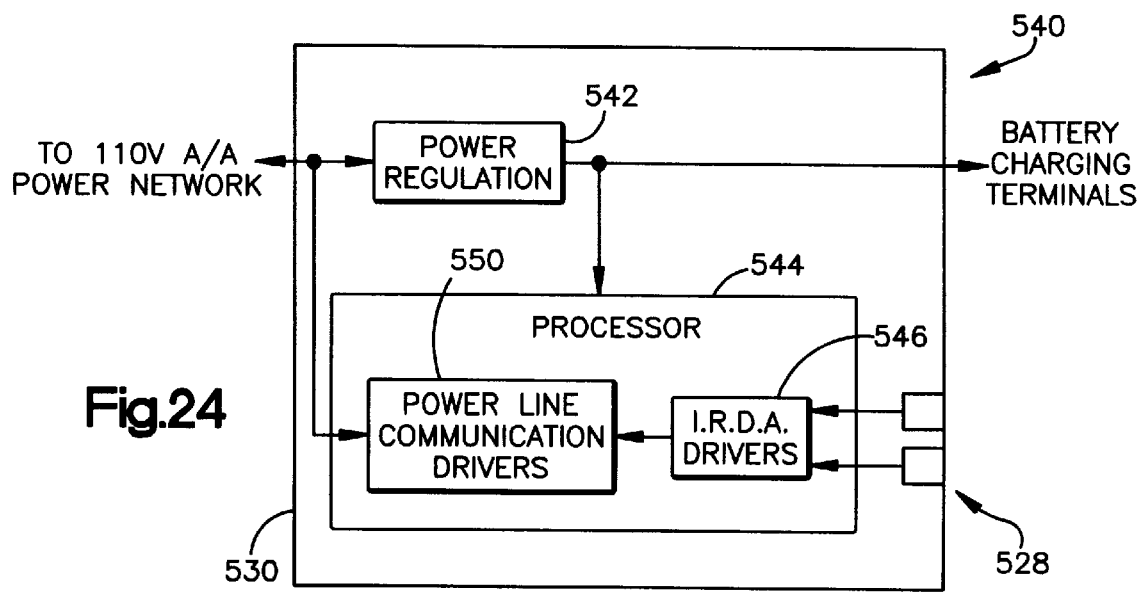
FIG. 24 is a block diagram of circuitry disposed within the docking station of FIG. 23.

The terminal also includes a communications port 520. The port 520 may be modem circuitry with an RJ II connector 522 for communication with an ISP via Plain Old Telephone Service subscriber loop 524. Alternatively, in FIG. 22 the port may include IRDA circuitry 526 and an LED/photo sensor 528 combination for infra red communication with an aligned IRDA port in a docking cradle 530 shown in FIG. 23. It will be appreciated that any physical/transparent layout scheme including integrated services digital network, asynchronous mode transmission, etc. is also suitably employed. The docking cradle 530 includes structure 532 for holding the terminal and 110V outlet prongs 534 for securing the docking cradle to an outlet (not shown) on the wall in the consumer's home. The circuity within the docking cradle 530 is best described with reference to block diagram 540 of FIG. 24. The docking cradle 530 advantageously includes power regulation circuitry 542 for converting household 110V AC power to power suitable for charging the batteries in the terminal and suitable for powering a docketing cradle processor 544. The docking station processor 544 includes IRDA drivers 546 for communicating with the terminal via the IRDA port 528 and powerline communication drivers 550 for sending and receiving signals modulated on the home's AC power distribution network. Both of these drivers may, in part, be embodied in code stored in a memory and executed by a micro processor.

FIG. 25 is a block diagram of a consumer gateway 560. It includes a powerline communication driver 562 for communicating with the docking cradle 530 via the home's power distribution network (not shown) and communication drivers 564 adapted to communicate with an Internet service provider. Power regulation circuitry 566 powers the drivers. It should be appreciated that this gateway circuitry may be embodied in a cable TV box which provides communication to an Internet router via the co-axial cable. Alternatively, this circuitry may be in a telephone or other device which is connected to an Internet Service Provider ("ISP") through a telephone service subscriber loop.

FIG. 26 shows a flowchart of the electronic shopping list program run on the merchant's server. Step 570 represents receipt of a link from the consumers terminal which includes a UPC code number and instructions to the server to launch the shopping list program. Step 572 represents sending a confirmation page to the consumer. The confirmation page may include the current price of the items, a choice of possible sizes, and/or other advertising information. Step 574 represents receipt of a link request with the confirmation information. If in step 576 the link request indicates that the consumer wants to not-add the item to the list, the server returns to the main menu page at 578. Alternatively, if the item is to be added, the server updates the consumer's shopping list in its data base at 580 and then returns to the main menu page at 578.

FIG. 27 represents the program run or the server when the server receives a link request at 584 indicating that the consumer desires to review the coupon file. Step 586 represents the server returning a coupon file page. Typically the coupon file page will contain a list of coupons or, graphically include an icon representative of each coupon. At 588 the server receives a link request with barcode data from the face of a scanned coupon or a link indicating the consumer's desire to return to the main menu. If, in step 590, return to the main menu is desired, the server sends the main menu page to the term at 592. If, in step 590, the link request includes a coupon barcode, the server updates the consumer's coupon file in the data base at 594, at 596 updates the coupon file page and returns the updated file to the consumer's terminal at 586.

As can be seen, all of the substantive processing is performed on the server, therefore, the operation of the consumer terminal is suitably a conventional web browser. However to facilitate consumer use in an environment where the device does not have a full time Internet link, it is quite possible to store the electronic shopping list program and the coupon file program in the consumer's terminal. Therefore, the device can be used off-line and, when corrected, batch load the shopping list and coupon file up to the merchant's server.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A system for building shopping list information comprising:
    (a) a portable interface unit including a data system for receiving product identification data representing a product selected by a consumer for inquiry and a data communication system for communicating data on a first network infrastructure;
    (b) a consumer gateway for providing an interface between the first network infrastructure and the portable interface unit; and
    (c) a merchant's computer system including a communication system for receiving identification data requests over a second network infrastructure and a memory for storing data representing the product data identification, the first network infrastructure being coupled to the second infrastructure.

2. The system for building shopping list information of claim 1, wherein the first network infrastructure is a network local to a consumer's home and the second network infrastructure is a wide area network.

3. The system for building shopping list information of claim 2, wherein the second network infrastructure is the Internet.

4. The system for building shopping list information of claim 3, where the merchant's computer system includes a database matching the product identification data to packaging information related to the product, the packaging information representing other products which are alternative packaging sizes of the product.

5. The system for building shopping list information of claim 4, wherein the merchant's computer system transmits, over the second network infrastructure, the packaging information in response to receipt of product identification data.

6. The system for building shopping list information of claim 5, wherein the portable interface unit includes a user interface for providing the packaging information to the consumer and receiving selection data from the consumer, the selection data representing a product selected for purchase and the data communication system further communicates the selection data on the first data infrastructure.

7. The system for building shopping list information of claim 6, wherein the merchant's computer system further includes a database for storing the selection data for a plurality of products selected for purchase.

8. The system for building shopping list information of claim 7, wherein the merchant's computer system further includes a mobile customer terminal and a wireless network infrastructure communicating data between a host computer and the mobile customer terminal.

9. The system for building shopping list information of claim 8, wherein the mobile customer terminal includes a user interface for providing the selection data to the consumer.

10. The system for building shopping list information of claim 3, where the merchant's computer system includes a database matching the product identification data to complimentary information related to the product, the complimentary information representing other products which are complimentary with the product.

11. The system for building shopping list information of claim 10, wherein the merchant's computer system transmits, over the second network infrastructure, the complimentary information in response to receipt of product identification data.

12. The system for building shopping list information of claim 11, wherein the portable interface unit includes a user interface for providing the complimentary information to the consumer and receiving selection data from the consumer, the selection data representing a product selected for purchase from the other products represented by the complimentary information and the data communication system further communicates the selection data on the first data infrastructure.

13. The system for building shopping list information of claim 12, wherein the merchant's computer system further includes a database for storing the selection data for a plurality of products selected for purchase.

14. The system for building shopping list information of claim 13, wherein the merchant's customer further includes a mobile customer terminal and a wireless network infrastructure communicating data between a host computer and the mobile customer terminal.

15. The system for building shopping list information of claim 14, wherein the mobile customer terminal includes a user interface for providing the selection data to the consumer.

16. The system for building shopping list information of claim 15, wherein the complimentary information further includes a recipe in which at least a portion of the product is used and the other products include products that are referenced in the recipe.

17. The system for building shopping list information of claim 3, where the merchant's computer system includes a database matching the product identification data to competitive information related to the product, the competitive information representing other products which are alternative competitive products.

18. The system for building shopping list information of claim 17, wherein the merchant's computer transmits, over the second network infrastructure, the competitive information in response to receipt of product identification data.

19. The system for building shopping list information of claim 18, wherein the portable interface unit includes a user interface for providing the competitive information to the consumer and receiving selection data from the consumer, the selection data representing a product selected for purchase and the data communication system further communicates the selection data on the first data infrastructure.

20. The system for building shopping list information of claim 19, wherein the merchant's computer system further includes a database for storing the selection data for a plurality of products selected for purchase.

21. The system for building shopping list information of claim 20, wherein the merchant's computer system further includes a mobile customer terminal and a wireless network infrastructure communicating data between a host computer and the mobile customer terminal.

22. The system for building shopping list information of claim 21, wherein the mobile customer terminal includes a user interface for providing the selection data to the consumer.

23. The system for building shopping list information of claim 1, wherein a cradle couples the consumer gateway to the portable interface unit.

24. The system for building shopping list information of claim 23, wherein the consumer gateway and the cradle communicate through a home power distribution network.

25. The system for building shopping list information of claim 24, wherein the portable interface unit communicates with the cradle through an IRDA port.

* * * * *

UNITED STATES PATENT AND TRADEMARK OFFICE
CERTIFICATE OF CORRECTION

PATENT NO.: 6,129,276

DATED: October 10, 2000

INVENTOR(S): Jelen, et al.

It is certified that error appears in the above-identified patent and that said Letters Patent is hereby corrected as shown below:

At column 7, line 50: please replace "10" with - -110- -.

At column 9, line 4: please replace "Alternatively" with - - Alternatively- -.

Signed and Sealed this

Twenty-fourth Day of April, 2001

NICHOLAS P. GODICI

Attest:

Attesting Officer     Acting Director of the United States Patent and Trademark Office